(12) United States Patent
Sun et al.

(10) Patent No.: US 10,673,553 B2
(45) Date of Patent: Jun. 2, 2020

(54) SEARCH SPACE OVERBOOKING AND PRUNING

(71) Applicant: QUALCOMM Incorporated, San Diego, CA (US)

(72) Inventors: Jing Sun, San Diego, CA (US); Huilin Xu, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/360,810

(22) Filed: Mar. 21, 2019

(65) Prior Publication Data

US 2019/0296847 A1    Sep. 26, 2019

Related U.S. Application Data

(60) Provisional application No. 62/647,553, filed on Mar. 23, 2018.

(51) Int. Cl.
*H04W 24/10* (2009.01)
*H04J 11/00* (2006.01)
(Continued)

(52) U.S. Cl.
CPC ........ *H04J 11/0086* (2013.01); *H04L 5/0053* (2013.01); *H04L 25/0238* (2013.01);
(Continued)

(58) Field of Classification Search
CPC ..... H04J 11/0086; H04W 24/10; H04W 8/26; H04W 72/042; H04L 25/0238
(Continued)

(56) References Cited

U.S. PATENT DOCUMENTS

| 9,503,239 | B2 * | 11/2016 | Larsson | H04L 5/0053 |
| 10,027,460 | B2 * | 7/2018 | McBeath | H04L 5/0053 |
| 10,536,934 | B2 * | 1/2020 | Frenne | H04W 72/042 |

OTHER PUBLICATIONS

Ericsson: "Remaining Issues on Search Spaces", 3GPP Draft, R1-1802903, 3GPP TSG RAN WG1 Meeting #92, 3rd Generation Partnership Project (3GPP), Mobile Competence Centre, 650, Route Des Lucioles, F-06921 Sophia-Antipolis Cedex, France, vol. RAN WG1, No. Athens, Greece, 20180226-20180302, Feb. 17, 2018 (Feb. 17, 2018), XP051398292, 17 Pages, Retrieved from the Internet: URL:http://www.3gpp.org/ftp/tsg%5Fran/WG1%5FRL1/TSGR1%5F92/Docs/ [retrieved on Feb. 17, 2018] sections 1-3.
(Continued)

*Primary Examiner* — Congvan Tran
(74) *Attorney, Agent, or Firm* — Holland & Hart LLP

(57) ABSTRACT

Methods, systems, and devices for wireless communication are described. In some cases, due to blind decoding and channel estimation (CE) limits, one or more user equipment (UE) specific search sets may be pruned for blind decoding and/or CE purposes. For instance, after hashing a set of common decoding candidates to control channel elements (CCEs) within the control region, the UE specific search sets may be pruned so as to conform to the blind decode limitation, since a common search space has already occupied a portion of the total blind decode limit. Following pruning, the UE may hash the sets of UE-specific decoding candidates associated with the one or more UE specific search sets to CCEs within the control region. The UE may further prune UE specific search sets, based on CE limits, while reusing CE for overlapping hashed locations.

15 Claims, 17 Drawing Sheets

(51) Int. Cl.
*H04W 8/26* (2009.01)
*H04W 72/04* (2009.01)
*H04L 25/02* (2006.01)
*H04L 5/00* (2006.01)

(52) U.S. Cl.
CPC ............. *H04W 8/26* (2013.01); *H04W 24/10* (2013.01); *H04W 72/042* (2013.01); *H04L 5/0007* (2013.01)

(58) Field of Classification Search
USPC .................. 455/434, 509; 370/241, 328–329; 375/260
See application file for complete search history.

(56) References Cited

OTHER PUBLICATIONS

Interdigital Inc: "On Remaining Issues of Search Space", 3GPP Draft, 3GPP TSG RAN WG1 Meeting #92, R1-1802622 On Remaining Issues of Search Space, 3RD Generation Partnership Project (3GPP), Mobile Competence Centre, 650, Route Des Lucioles, F-06921 Sophia-Antipolis Cedex, France, vol. RAN WG1, No. Athens, Greece, 20180226-20180302, Feb. 17, 2018 (Feb. 17, 2018), XP051398060, 7 Pages, Retrieved from the Internet: URL:http:// www.3gpp.org/ftp/tsg%5Fran/WG1%5FRL1/TSGR1%5F92/Docs/ [retrieved on Feb. 17, 2018] sections 1-3.

International Search Report and Written Opinion—PCT/US2019/ 023710—ISA/EPO—Jun. 3, 2019.

Nokia et al., "On Reducing the PDCCH Channel Estimation and BD Complexity in NR", 3GPP Draft; 3GPP TSG RAN WG1 Ad Hoc 1801, R1-1800550_BD_CCE_REDUCTION_NOK, 3rd Generation Partnership Project (3GPP), Mobile Competence Centre; 650, Route Des Lucioles; F-06921 Sophia-Antipolis Cedex; France, vol. RAN WG1, No. Vancouver, Canada; 20180122-20180126 Jan. 12, 2018, XP051384382, Retrieved from the Internet: URL:http://www. 3gpp.org/ftp/tsg%5Fran/WG1%5FRL1/TSGR1%5FAH/NR%5FAH% 5F1801/Docs/ [retrieved on Jan. 12, 2018], Section "2.2 Revisiting the NR hashing function", 14 pages, Section 2, par. 1, 4, "Proposal #1 . . ." section 2.1, par. 1, sections 2.1.1, 2.1.2, section 2.1.3, sections 1-5,par. 1 and subsection "38.213 Text Proposal", last two paragraphs.

Qualcomm Incorporated: "Remaining Issues on Control Resource Set and Search Space", 3GPP Draft, 3GPP TSG RAN WG1 Meeting #92, R1-1802834 Control Resource Set and Search Space, 3RD Generation Partnership Project (3GPP), Mobile Competence Centre, 650, Route Des Lucioles, F-06921 Sophia-Antipolis Cedex, France, vol. RAN WG1, No. Athens, Greece, 20180226-20180302, Feb. 17, 2018 (Feb. 17, 2018), XP051398247, pp. 1-8, Retrieved from the Internet: URL:http://www.3gpp.org/ftp/tsg%5Fran/WG1% 5FRL1/TSGR1%5F92/Docs/ [retrieved on Feb. 17, 2018] sections 1-8.

* cited by examiner

SEARCH SPACE OVERBOOKING AND PRUNING

CROSS REFERENCES

The present Application for Patent claims the benefit of U.S. Provisional Patent Application No. 62/647,553 by Sun et al., entitled "SEARCH SPACE OVERBOOKING AND PRUNING," filed Mar. 23, 2018, assigned to the assignee hereof, and expressly incorporated herein.

BACKGROUND

The following relates generally to wireless communication, and more specifically to search space overbooking and pruning.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, such as those having multiple possible control channel configurations and/or multiple possibly overlapping monitoring occasions, search space configurations may allow overbooking of decoding candidates. For example, overbooking may refer to configuring more blind decoding candidates than a UE may be capable of processing. Additionally or alternatively, overbooking may refer to search spaces that span an amount of resources that exceeds a UE capability for performing channel estimation. Overbooking of search spaces may present challenges in scheduling and monitoring for downlink control information.

SUMMARY

The described techniques relate to improved methods, systems, devices, or apparatuses that support search space overbooking and pruning. In some cases, due to blind decoding and control channel element (CCE) channel estimation (CE) limitations, some decoding candidates (e.g., a physical downlink control channel (PDCCH) candidate) of one or more search space sets may be dropped (or pruned) for blind decoding and/or CE purposes. In order to optimize the number of decoding candidates for search space sets that can be admitted, the pruning may be performed via a multiple step process. For instance, a common search space (CSS) may be prioritized, and after hashing the set of CSS decoding candidates to CCEs within the control region, the UE may prune UE-specific search space (USS) sets so as to conform to the blind decode limitation, since the CSS has already occupied a portion of the total blind decode limit. In some cases, following pruning the USS sets, the UE may hash the sets of UE-specific decoding candidates associated with the one or more USS sets to CCEs within the control region. The UE may further prune one or more USS sets, based in part on the CCE CE limitation, while attempting to maximize the number of UE-specific decoding candidates that may be used for CE and blind decoding (e.g., by free admission and reuse of channel estimation). In some cases, such a technique may avoid or minimize recursive processes, which may serve to optimize computational complexity at the UE.

A method of wireless communication at a UE is described. The method may include identifying, for a control region of a control channel, one or more sets of decoding candidates associated with one or more search space sets, determining a total number of available CCEs for the one or more search space sets based on a CCE channel estimation limitation, determining respective numbers of available CCEs for the one or more search space sets based on the total number of available CCEs, determining an applied one or more sets of decoding candidates by hashing a first subset of the one or more sets of decoding candidates to a first subset of CCEs of the control region based on the respective numbers of available CCEs, and admitting a second subset of the one or more sets of decoding candidates having hashed locations overlapping with the first subset of CCEs, and monitoring the control region for the applied one or more sets of decoding candidates.

An apparatus for wireless communication at a UE is described. The apparatus may include a processor, memory in electronic communication with the processor, and instructions stored in the memory. The instructions may be executable by the processor to cause the apparatus to identifying, for a control region of a control channel, one or more sets of decoding candidates associated with one or more search space sets, determining a total number of available CCEs for the one or more search space sets based on a CCE channel estimation limitation, determining respective numbers of available CCEs for the one or more search space sets based on the total number of available CCEs, determining an applied one or more sets of decoding candidates by hashing a first subset of the one or more sets of decoding candidates to a first subset of CCEs of the control region based on the respective numbers of available CCEs, and admitting a second subset of the one or more sets of decoding candidates having hashed locations overlapping with the first subset of CCEs, and monitoring the control region for the applied one or more sets of decoding candidates.

Another apparatus for wireless communication at a UE is described. The apparatus may include means for identifying, for a control region of a control channel, one or more sets of decoding candidates associated with one or more search space sets, means for determining a total number of available CCEs for the one or more search space sets based on a CCE channel estimation limitation, means for determining respective numbers of available CCEs for the one or more search space sets based on the total number of available CCEs, means for determining an applied one or more sets of decoding candidates by hashing a first subset of the one or more sets of decoding candidates to a first subset of CCEs of the control region based on the respective numbers of available CCEs, and means for admitting a second subset of the one or more sets of decoding candidates having hashed locations overlapping with the first subset of CCEs, and means for monitoring the control region for the applied one or more sets of decoding candidates.

A non-transitory computer-readable medium storing code for wireless communication at a UE is described. The code may include instructions executable by a processor to identifying, for a control region of a control channel, one or more sets of decoding candidates associated with one or more search space sets, determining a total number of available CCEs for the one or more search space sets based on a CCE channel estimation limitation, determining respective numbers of available CCEs for the one or more search space sets based on the total number of available CCEs, determining an applied one or more sets of decoding candidates by hashing a first subset of the one or more sets of decoding candidates to a first subset of CCEs of the control region based on the respective numbers of available CCEs, and admitting a second subset of the one or more sets of decoding candidates having hashed locations overlapping with the first subset of CCEs, and monitoring the control region for the applied one or more sets of decoding candidates.

Some examples of the method, apparatuses, and non-transitory computer-readable medium described herein may further include operations, features, means, or instructions for determining a total number of available blind decodes for the one or more search space sets based on a blind decoding limitation of the UE, determining respective numbers of available blind decodes for the one or more search space sets based on the total number of available blind decodes and pruning the one or more sets of decoding candidates based on the respective numbers of available blind decodes for the one or more search space sets.

In some examples of the method, apparatuses, and non-transitory computer-readable medium described herein, the determining the respective numbers of available blind decodes includes allocating the total number of available blind decodes for the one or more search space sets to the one or more search space sets in proportion to respective numbers of decoding candidates in the one or more search space sets.

In some examples of the method, apparatuses, and non-transitory computer-readable medium described herein, the determining the respective numbers of available blind decodes includes uniformly allocating the total number of available blind decodes to the one or more search space sets.

In some examples of the method, apparatuses, and non-transitory computer-readable medium described herein, the determining the respective numbers of available blind decodes includes allocating a minimum number of blind decodes to each of the one or more search space sets.

Some examples of the method, apparatuses, and non-transitory computer-readable medium described herein may further include operations, features, means, or instructions for identifying, for the control region, a set of common decoding candidates associated with a common search space set and hashing the set of common decoding candidates to a second subset of CCEs of the control region, where the total number of available blind decodes may be determined based on a number of decoding candidates of the set of common decoding candidates and the blind decoding limitation of the UE.

In some examples of the method, apparatuses, and non-transitory computer-readable medium described herein, the determining the respective numbers of available CCEs for the one or more sets of decoding candidates may include operations, features, means, or instructions for allocating the total number of available CCEs to the one or more search space sets in proportion to respective numbers of CCEs spanned by respective sets of decoding candidates in the one or more search space sets.

In some examples of the method, apparatuses, and non-transitory computer-readable medium described herein, the determining the respective numbers of available CCEs for the one or more sets of decoding candidates may include operations, features, means, or instructions for uniformly allocating the total number of available CCEs to the one or more search space sets.

In some examples of the method, apparatuses, and non-transitory computer-readable medium described herein, the determining the respective numbers of available CCEs for the one or more sets of decoding candidates may include operations, features, means, or instructions for allocating a minimum number of CCEs to each of the one or more search space sets.

In some examples of the method, apparatuses, and non-transitory computer-readable medium described herein, the determining the respective numbers of available CCEs for the one or more sets of decoding candidates may include operations, features, means, or instructions for allocating the total number of available CCEs to the one or more search space sets based on an aggregation level size of decoding candidates in the one or more search space sets.

In some examples of the method, apparatuses, and non-transitory computer-readable medium described herein, where for each of the one or more search space sets, the determining the applied one or more sets of decoding candidates may include operations, features, means, or instructions for identifying decoding candidates of the each aggregation level spanning a number of CCEs less than or equal to a remaining number of the number of available CCEs, hashing the identified decoding candidates to CCEs of the first subset of CCEs, and including (or admitting) decoding candidates of a next aggregation level lower than the each aggregation level that hash to CCEs of the first subset of CCEs.

In some examples of the method, apparatuses, and non-transitory computer-readable medium described herein, where, for each of the one or more search space sets, the determining the applied one or more sets of decoding candidates may include operations, features, means, or instructions for identifying, for each aggregation level from a highest aggregation level to a lowest aggregation level of the each of the one or more search space sets, decoding candidates of the each aggregation level spanning a number of CCEs less than or equal to a remaining number of the number of available CCEs, hashing the identified decoding candidates to CCEs of the first subset of CCEs, and including (or admitting) decoding candidates of aggregation levels lower than a lowest aggregation level that hashed to CCEs of the first subset of CCEs.

Some examples of the method, apparatuses, and non-transitory computer-readable medium described herein may further include operations, features, means, or instructions for identifying, for the control region, a set of common decoding candidates associated with a common search space set and hashing the set of common decoding candidates to a second subset of CCEs of the control region, where the total number of available CCEs may be determined based on the CCE channel estimation limitation and a number of CCEs of the second subset of CCEs.

In some examples of the method, apparatuses, and non-transitory computer-readable medium described herein, the determining the applied one or more sets of decoding candidates may include operations, features, means, or instructions for admitting, prior to the admitting the second subset of the one or more sets of decoding candidates, a third subset of the one or more sets of decoding candidates having hashed locations overlapping with the second subset of CCEs.

A method of wireless communication at a base station is described. The method may include identifying, for a control region of a control channel, one or more sets of decoding candidates associated with one or more search space sets, determining a total number of available CCEs for the one or more search space sets based on a CCE channel estimation limitation, determining respective numbers of available CCEs for the one or more search space sets based on the total number of available CCEs, determining an applied one or more sets of decoding candidates by hashing a first subset of the one or more sets of decoding candidates to a first subset of CCEs of the control region based on the number of available CCEs, and admitting a second subset of the one or more sets of decoding candidates having hashed locations overlapping with the first subset of CCEs, and transmitting control information to the UE via the control channel.

An apparatus for wireless communication at a base station is described. The apparatus may include a processor, memory in electronic communication with the processor, and instructions stored in the memory. The instructions may be executable by the processor to cause the apparatus to identifying, for a control region of a control channel, one or more sets of decoding candidates associated with one or more search space sets, determining a total number of available CCEs for the one or more search space sets based on a CCE channel estimation limitation, determining respective numbers of available CCEs for the one or more search space sets based on the total number of available CCEs, determining an applied one or more sets of decoding candidates by hashing a first subset of the one or more sets of decoding candidates to a first subset of CCEs of the control region based on the number of available CCEs, and admitting a second subset of the one or more sets of decoding candidates having hashed locations overlapping with the first subset of CCEs, and transmitting control information to the UE via the control channel.

Another apparatus for wireless communication at a base station is described. The apparatus may include means for identifying, for a control region of a control channel, one or more sets of decoding candidates associated with one or more search space sets, means for determining a total number of available CCEs for the one or more search space sets based on a CCE channel estimation limitation, means for determining respective numbers of available CCEs for the one or more search space sets based on the total number of available CCEs, means for determining an applied one or more sets of decoding candidates by hashing a first subset of the one or more sets of decoding candidates to a first subset of CCEs of the control region based on the number of available CCEs, and means for admitting a second subset of the one or more sets of decoding candidates having hashed locations overlapping with the first subset of CCEs, and means for transmitting control information to the UE via the control channel.

A non-transitory computer-readable medium storing code for wireless communication at a base station is described. The code may include instructions executable by a processor to identifying, for a control region of a control channel, one or more sets of decoding candidates associated with one or more search space sets, determining a total number of available CCEs for the one or more search space sets based on a CCE channel estimation limitation, determining respective numbers of available CCEs for the one or more search space sets based on the total number of available CCEs, determining an applied one or more sets of decoding candidates by hashing a first subset of the one or more sets of decoding candidates to a first subset of CCEs of the control region based on the number of available CCEs, and admitting a second subset of the one or more sets of decoding candidates having hashed locations overlapping with the first subset of CCEs, and transmitting control information to the UE via the control channel.

Some examples of the method, apparatuses, and non-transitory computer-readable medium described herein may further include operations, features, means, or instructions for determining a total number of available blind decodes for the one or more search space sets based on a blind decoding limitation of the UE, determining respective numbers of available blind decodes for the one or more search space sets based on the total number of available blind decodes and pruning the one or more sets of decoding candidates based on the respective numbers of available blind decodes for the one or more search space sets.

In some examples of the method, apparatuses, and non-transitory computer-readable medium described herein, the determining the respective numbers of available blind decodes includes allocating the total number of available blind decodes for the one or more search space sets to the one or more search space sets in proportion to respective numbers of decoding candidates in the one or more search space sets.

In some examples of the method, apparatuses, and non-transitory computer-readable medium described herein, the determining the respective numbers of available blind decodes includes uniformly allocating the total number of available blind decodes to the one or more search space sets.

In some examples of the method, apparatuses, and non-transitory computer-readable medium described herein, the determining the respective numbers of available blind decodes includes allocating a minimum number of blind decodes to each of the one or more search space sets.

Some examples of the method, apparatuses, and non-transitory computer-readable medium described herein may further include operations, features, means, or instructions for identifying, for the control region, a set of common decoding candidates associated with a common search space set and hashing the set of common decoding candidates to a second subset of CCEs of the control region, where the total number of available blind decodes may be determined based on a number decoding candidates of the set of common decoding candidates and the blind decoding limitation of the UE.

In some examples of the method, apparatuses, and non-transitory computer-readable medium described herein, the determining the respective numbers of available CCEs for the one or more sets of decoding candidates may include operations, features, means, or instructions for allocating the total number of available CCEs to the one or more search space sets in proportion to respective numbers of CCEs spanned by respective sets of decoding candidates in the one or more search space sets.

In some examples of the method, apparatuses, and non-transitory computer-readable medium described herein, the determining the respective numbers of available CCEs for the one or more sets of decoding candidates may include operations, features, means, or instructions for uniformly allocating the total number of available CCEs to the one or more search space sets.

In some examples of the method, apparatuses, and non-transitory computer-readable medium described herein, the determining the respective numbers of available CCEs for the one or more sets of decoding candidates may include operations, features, means, or instructions for allocating a minimum number of CCEs to each of the one or more search space sets.

In some examples of the method, apparatuses, and non-transitory computer-readable medium described herein, the determining the respective numbers of available CCEs for the one or more sets of decoding candidates may include operations, features, means, or instructions for allocating the total number of available CCEs to the one or more search space sets based on an aggregation level size of decoding candidates in the one or more search space sets.

In some examples of the method, apparatuses, and non-transitory computer-readable medium described herein, where, for each of the one or more search space sets, the determining the applied one or more sets of decoding candidates may include operations, features, means, or instructions for identifying decoding candidates of the each aggregation level spanning a number of CCEs less than or equal to a remaining number of the number of available CCEs, hashing the identified decoding candidates to CCEs of the first subset of CCEs, and including (or admitting) decoding candidates of a next aggregation level lower than the each aggregation level that hash to CCEs of the first subset of CCEs.

In some examples of the method, apparatuses, and non-transitory computer-readable medium described herein, where, for each of the one or more search space sets, the determining the applied one or more sets of decoding candidates may include operations, features, means, or instructions for identifying, for each aggregation level from a highest aggregation level to a lowest aggregation level of the each of the one or more search space sets, decoding candidates of the each aggregation level spanning a number of CCEs less than or equal to a remaining number of the number of available CCEs, hashing the identified decoding candidates to CCEs of the first subset of CCEs, and including (or admitting) decoding candidates of aggregation levels lower than a lowest aggregation level that hashed to CCEs of the first subset of CCEs.

Some examples of the method, apparatuses, and non-transitory computer-readable medium described herein may further include operations, features, means, or instructions for identifying, for the control region, a set of common decoding candidates associated with a common search space set and hashing the set of common decoding candidates to a second subset of CCEs of the control region, where the total number of available CCEs may be determined based on the CCE channel estimation limitation and a number of CCEs of the second subset of CCEs.

In some examples of the method, apparatuses, and non-transitory computer-readable medium described herein, the determining the applied one or more sets of decoding candidates may include operations, features, means, or instructions for admitting, prior to the admitting the second subset of the one or more sets of decoding candidates, a third subset of the one or more sets of decoding candidates having hashed locations overlapping with the second subset of CCEs.

DETAILED DESCRIPTION

Figure 1:
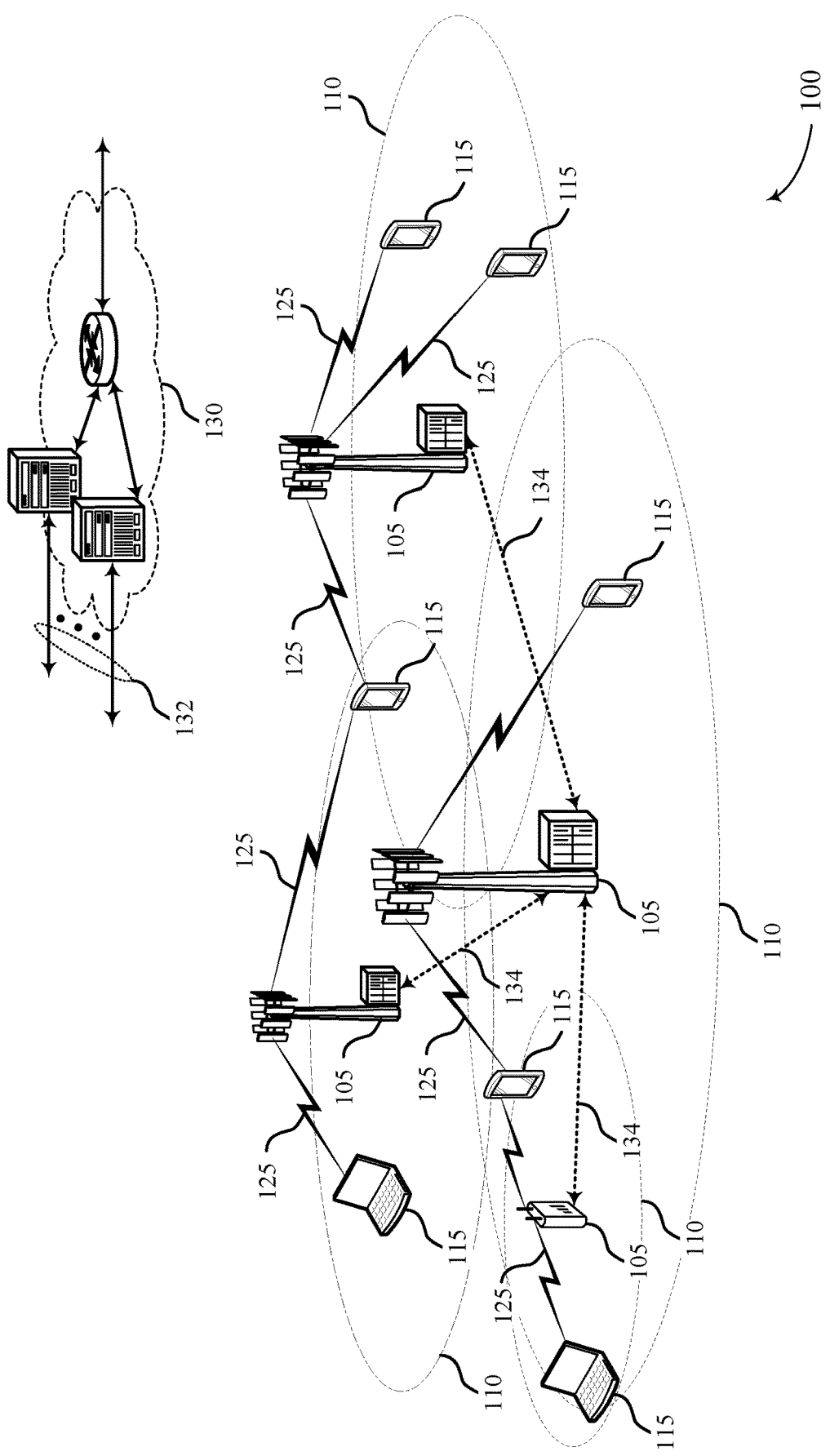
FIG. 1 illustrates an example of a wireless communications system that supports search space overbooking and pruning in accordance with aspects of the present disclosure.

In some wireless communications systems, a base station may transmit control information to a user equipment (UE) or a group of UEs on the downlink. The UEs may use the downlink control information (DCI) to support communications with the base station. The base station may configure search space sets with decoding candidates (e.g., a PDCCH candidate) at one or more aggregation levels to use for these DCI transmissions. When configuring a search space set, the base station may determine a control resource set (CORESET) containing the search space set. This CORESET may include a number of control channel elements (CCEs) and the search space set may be mapped to a CCE space corresponding to a subset of CCEs of the CORESET. The base station may identify decoding candidates to allocate at each aggregation level for the search space set, and may assign positions for the decoding candidates within the CCE space according to a hash function. The UEs may identify this search space set configuration, and may monitor the CCEs corresponding to the hashed decoding candidates for any DCI transmissions from the base station. A control region may be a search space monitoring occasion for one or more search space sets that has a common reference signal configuration (e.g., shares a scrambling sequence, etc.). Different CORESETS may be considered to be different control regions, even when overlapping partially or completely. In addition, a same CORESET may result in multiple regions, when configured for multiple monitoring occasions (e.g., different starting symbols within a slot, etc.).

In some wireless communication systems, UEs may have limitations for processing a control channel. For example, UE limitations may include a limitation on the number of blind decodes, or number of resources for performing channel estimation (CE) within a certain duration (e.g., a symbol period or slot). In some cases, configured search space sets may include common search space (CSS) sets, UE-specific search space (USS) sets, or a combination thereof. In some cases, the CSS set(s) may have a higher priority than USS set(s). Thus, for each control region within a slot, the UE may hash the set of common decoding candidates associated with one or more CSS sets, prior to hashing the sets of UE-specific decoding candidates associated with the one or more USS sets. In some cases, the decoding candidates associated with the USS sets, may include one or more sets of UE-specific decoding candidates. Further, since the UE may hash the common decoding candidates and UE-specific decoding candidates separately to CCEs within the control region, the UE may reuse the channel estimation from the one or more CSS sets for the one or more USS sets. In some cases, some UE-specific decoding candidates may be admitted for blind decoding without increasing the resources for CE, which may be referred to as free admission between hashing common and UE-specific decoding candidates to the same CCEs.

In some cases, a pre-defined duration (e.g., a slot) may comprise one or more control regions. Further, each control region within the slot may comprise one or more CSS sets, and one or more USS sets. In some cases, a CSS set or USS set may be associated with one or more decoding candidates at one or more aggregation levels (ALs). Further, each search space set may be uniquely identified by a search space set identifier (ID). It should be noted that for the sake of simplicity, the following notation is used for the remainder of the specification, including the figures: $R_i$ refers to a Control Region i, $S_{i,c,m}$ refers to a CSS m in Control Region i, and $S_{i,u,n}$ refers to a USS set n in Control Region i.

In some cases, UEs may be subject to capability limitations on the number of CCEs that may contain control information, on a number of blind decoding attempts that a UE may support for a particular duration (e.g., within a slot or mini-slot), or the total number of CCEs for which channel estimation may be performed (e.g., within a slot or mini-slot). In some cases, the CSS sets may have a higher priority than USS sets. Thus, for each control region within a slot, the UE may hash the set of common decoding candidates associated with one or more CSS sets, prior to hashing the sets of UE-specific decoding candidates associated with one or more USS sets. In some cases, one or more decoding candidates of USS sets may be dropped (or pruned) because of blind decoding and/or CE limitations. In order to optimize the number of UE-specific decoding candidates in the USS sets that can be admitted for use, the pruning may be performed via a multiple step process. For instance, after hashing the set of common decoding candidates to CCEs within the control region, the UE may prune USS sets so as to conform to the blind decode limitation, since the CSS sets have already occupied a portion of the total blind decode limit. In some examples, pruning may include pruning one or more sets of UE-specific decoding candidates of one or more UE-specific search space sets. In some cases, following pruning the USS sets, the UE may hash the sets of UE-specific decoding candidates associated with the one or more USS sets to CCEs within the control region. The UE may further prune one or more USS sets, based in part on the CCE CE limitation, while attempting to maximize the number of UE-specific decoding candidates that may be used for CE and blind decoding (e.g., by free admission and reuse of channel estimation).

Aspects of the disclosure are initially described in the context of a wireless communications system. Aspects of the disclosure are further illustrated by and described with reference to decoding candidate hashing and pruning procedures, and a process flow. Aspects of the disclosure are further illustrated by and described with reference to apparatus diagrams, system diagrams, and flowcharts that relate to search space overbooking and pruning.

FIG. 1 illustrates an example of a wireless communications system 100 that supports search space overbooking and pruning in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some aspects, a base station 105 may configure a UE 105 with a set of CCEs of a control channel within a TTI. Additionally, the base station 105 may configure one or more search space sets that have decoding candidates at multiple different aggregation levels. In some cases, the one or more search space sets may include one or more CSS sets, USS sets, or a combination thereof. In some cases, the CSS sets may have a higher priority than USS sets. Thus, for each control region within a slot, the UE 115 may hash the set of common decoding candidates associated with one or more CSS sets, prior to hashing the sets of UE-specific decoding candidates associated with the one or more USS sets. In some cases, the UE-specific decoding candidates may include one or more sets of UE-specific decoding candidates. Further, since the UE 115 may hash the common decoding candidates and UE-specific decoding candidates separately to CCEs within the control region, the UE 115 may attempt to reuse the channel estimation for the one or more CSS sets. Thus, some UE-specific decoding candidates may be admitted for blind decoding without increasing the resources for CE, which may be referred to as free admission between hashing common and UE-specific decoding candidates.

In some cases, due to blind decoding and CCE CE limitations, one or more UE-specific decoding candidates in the USS sets may be dropped (or pruned) to conform with blind decoding and/or CE limitations. In order to optimize the number of UE-specific decoding candidates in the USS sets that can be admitted for use, the pruning may be performed via a multiple step process. For instance, after hashing the set of common decoding candidates to CCEs within the control region, the UE 115 may prune USS sets so as to conform to the blind decode limitation, since the CSS has already occupied a portion of the total blind decode limit. In some examples, pruning may include pruning one or more sets of UE-specific decoding candidates of one or more UE-specific search space sets. In some cases, following pruning the USS sets, the UE 115 may hash the sets of UE-specific decoding candidates associated with the one or more USS sets to CCEs within the control region. The UE 115 may further prune one or more USS sets, based in part on the CCE CE limitation, while attempting to reuse channel estimation.

Figure 2:
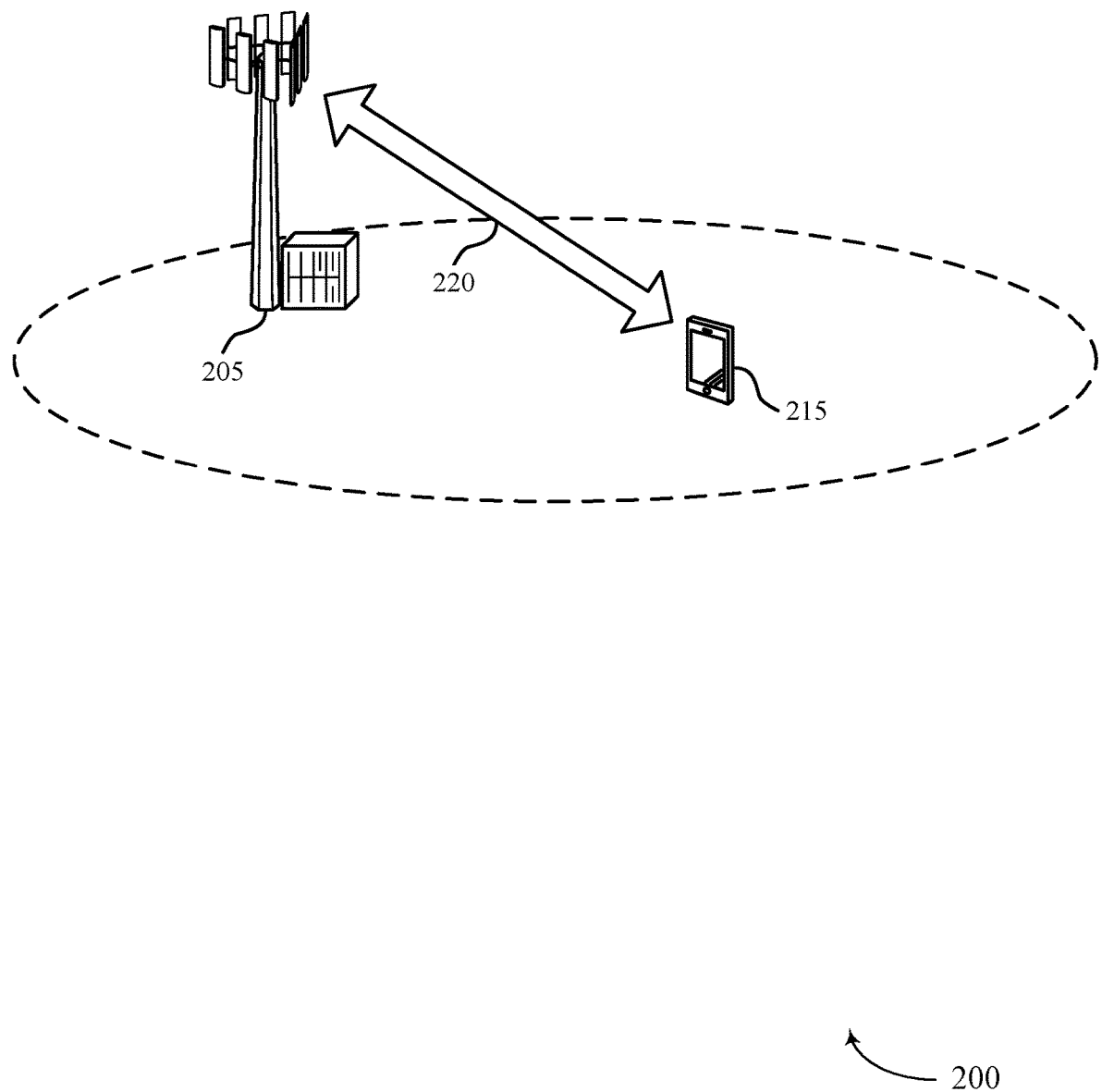
FIG. 2 illustrates an example of a wireless communications system that supports search space overbooking and pruning in accordance with aspects of the present disclosure.

FIG. 2 illustrates an example of a wireless communications system 200 that supports search space overbooking and pruning in accordance with aspects of the present disclosure.

In some examples, wireless communications system 200 may implement aspects of wireless communication system 100. The wireless communications system 200 may include UE 215 and base station 205, which may be examples of the UE 115 and base station 105 described with reference to FIG. 1. As shown, UE 215 may communicate with base station 205 via communication links 220. The wireless communications system 200 may also operate according to a radio access technology (RAT) such as a fifth generation (5G) new radio (NR) RAT, although techniques described herein may be applied to any RAT.

In some cases, the base station 205 may transmit control information indicating the scheduled and allocated resources in a downlink transmission to the UE 215. For example, the base station 205 may transmit DCI on a downlink control channel, such as a physical downlink control channel (PDCCH). In some examples, the base station 205 may transmit UE-specific scheduling assignments for downlink resource allocation, uplink grants, physical random access channel (PRACH) responses, uplink power control commands, and common scheduling assignments for signaling messages (e.g., such as system information) on the PDCCH. The base station 205 may transmit the control information during one or more symbols within a given slot (e.g., a TTI, an sTTI).

The base station 205 may configure a CORESET and search space for transmission of control information (e.g., DCI) to the UE 215 on a downlink control channel. In a control region of a TTI, there can be many locations where a DCI transmission may be located and the UE 215 may search all the possible locations. The possible locations for the DCI differ depending on the configured CORESET, whether the search space is UE-specific or common, and also the supported ALs. As previously described, in some cases, a pre-defined duration (e.g., a slot) may comprise none, or, one or more control regions. In some cases, different CORESETS may be considered to be independent control regions, even if they partially overlap. Further, the same CORESET may be monitored in different control regions (e.g., in different slots, mini-slots, etc.). Further, partially overlapping search space monitoring occasions (e.g., in time) may be counted separately. Thus, different slots may comprise different number of control regions. Further, each control region within the slot may include zero or more CSSs, and zero or more USS of varying aggregation levels, the combination referred to as CSS sets and USS sets, respectively. In some cases, the CSS set may have a higher priority than USS sets. Thus, a search space set may include a set of decoding candidates at multiple ALs, each of which may form a search space at a given AL. It should be noted that the AL for a search space may refer to the number of CCEs in multiples (e.g., AL 4 may indicate that control information for that AL is transmitted in multiples of four CCEs) used by the base station 205 to transmit control information to the UE 215.

The locations within a CORESET of the decoding candidates of a search space or search space set may be determined by a hash function and/or an offset. In some cases, the hash function may be an example of a uniform or approximately uniform distribution hash function (e.g., such as a combinatorial index hash function). A base station 105 utilizing such a hash function may spread the decoding candidates for each given aggregation level as evenly as possible across the range of CCEs. Alternatively, the hash function may be pseudo-random hash function. The range of CCEs may correspond to a CORESET, a TTI, or a subset of CCEs (e.g., where the CCEs may be non-contiguous, but may be stitched together for the purpose of hashing). Decoding candidates at different aggregation levels of the search space set may be hashed independently. In some cases, this may result in base station 105-a configuring a search space set where decoding candidates of different aggregation levels overlap for some CCEs.

In some cases, the UE 215 may have limitations on the number of blind decodings it can perform, or the number of CCEs that it can monitor within a certain TTI (e.g., a slot, mini-slot, etc.). That is, the UE 215 may be limited in the number of decoding candidates or CCEs for which it can monitor for DCI based on the blind decoding limitation or the CCE channel estimation limitation. In some cases, the base station 205 may ensure that the configured CORESETs and search space sets conform to the blind decoding or CCE CE limitations. In some other cases, the base station 205 may overbook the search space past one or more of the limitations, and the base station 205 and UE 215 may implement an overbooking rule to determine decoding candidates to drop from the configuration. In some cases, the base station 205 may determine the decoding candidates to drop based on CORESET priority, search space priority, candidate indexes, candidate aggregation levels, associated DCI formats, or some combination of these parameters.

In some cases, the UE 215 may identify for each control region within a time duration, such as a slot, one or more sets of decoding candidates (i.e., common decoding candidates and/or UE-specific decoding candidates) associated with one or more search space sets (i.e., CSS sets and/or USS sets). In some cases, the CSS set(s) may have a higher priority than USS set(s). Thus, for each control region within a slot, the UE may hash the set of common decoding candidates associated with one or more CSS sets, prior to hashing the sets of UE-specific decoding candidates (e.g., one or more sets of UE-specific decoding candidates) associated with one or more USS sets. Further, since the UE may hash the common decoding candidates and UE-specific decoding candidates separately to CCEs within the control region, the UE may attempt to reuse the channel estimation for CSS, if one or more CCEs hashed by a common decoding candidate overlap CCEs hashed by a UE-specific decoding candidate, which may be referred to as free admission. Free admission may refer to, for example, admitting the decoding candidate into the monitored or applied set of decoding candidates where admitting it without the overlap with CCEs having other decoding candidates already hashed would violate the CCE CE limitation. In some cases, free admission may be applied to decoding candidates only where the hashed CCEs for the decoding candidate fully overlap with CCEs having already admitted decoding candidates Following hashing common decoding candidates to CCEs within the control region, the UE 215 may proceed to identify the number of CCEs covered by the CSS sets, as well as the number of blind decoding candidates used. In some cases, the blind decode limit and CCE CE limit may be identified by X and Y, respectively, while the number of blind decoding candidates and CCE channel estimates used for CSS sets may be identified by $X_C$ and $Y_C$. Thus, the number of blind decodes and CCE channel estimates available for use by the USS sets may be identified by $X-X_C$ and $Y-Y_C$, respectively. It should be noted that the $Y-Y_C$ number is not a strict limit for CE for USS sets, due to hashing common and UE-specific decoding candidates to the same CCEs. In some cases, one or more UE-specific decoding candidates may be freely admitted for blind decoding due to being hashed to sets of CCEs already hashed by one or more common decoding candidates. In such cases, the channel estimation for the one or more UE-specific decoding candidates may be shared with the channel estimation for the common decoding candidates, without impacting the remaining budget, $Y-Y_C$. Further, it should be noted that while free admission may use one or more CCEs hashed by a common decoding candidate to fully overlap CCEs hashed by a UE-specific decoding candidate (i.e., to be used for blind decoding), channel estimation may be reused between common and UE-specific decoding candidates even for partially overlapping CCEs.

In some cases, due to blind decoding and CCE CE limitations, one or more UE-specific decoding candidates may be dropped (or pruned) for blind decoding and/or CE purposes. In order to optimize the number of UE-specific decoding candidates used, the pruning may be performed via a multiple step process. In some cases, the UE 215 may proceed to prune one or more UE-specific decoding candidates based in part on the number of available blind decodes for the one or more USS sets to ensure that the total remaining number of blind decodes is within $X-X_C$. For instance, the UE 215 may determine a respective number of available blind decodes for the one or more USS sets based in part on the total number of available blind decodes (e.g., $X-X_C$). Further, the total number of available blind decodes for the one or more USS sets may be allocated to the one or more USS sets in proportion to respective numbers of UE-specific decoding candidates in the one or more USS sets.

In some other cases, the total number of available blind decodes may be uniformly allocated to the one or more USS sets. Additionally or alternatively, a minimum number of blind decodes may be allocated to each of the USS sets, for example, ensuring at least one blind decode for each AL. In some cases, a minimum number of blind decodes may be allocated to each of the USS sets, and a remaining number of available blind decodes may be uniformly or proportionally allocated. Thus, in some cases, due to pruning, one or more USS sets in their respective control regions may be smaller than originally configured. In some cases, based upon base station 205 configuration and/or specification, the search space configuration may not exceed the blind decode limit. In such cases, pruning may not be deployed.

In some cases, an entire search space (e.g., USS) may be dropped if the total number of PDCCH candidates cannot be mapped by the UE. In this regard, some services may not be monitored in some control regions because the entire search space set has been dropped. In some cases, identifying, for a control region of a control channel, one or more sets of decoding candidates associated with one or more search space sets may allow only a part of the search space set to be dropped. For example, dropping portions of the control region associated with specific aggregation levels. In this regard, at least some of the PDCCH candidates may still be monitored when a number of PDCCH cannot be mapped by the UE and services associated with those PDCCH candidates may still be monitored in the control space.

Figure 3:
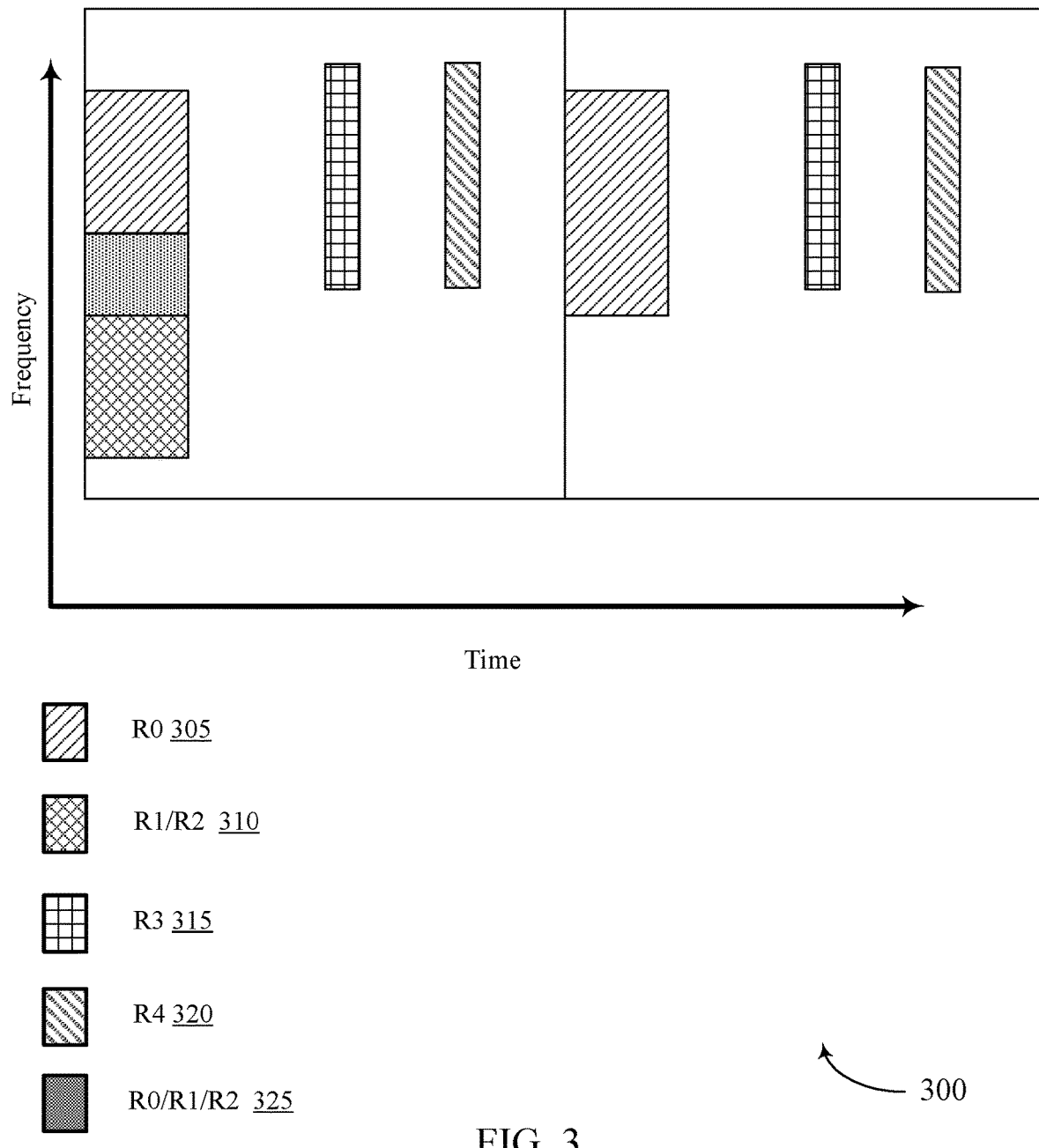
FIG. 3 illustrates an example of a control region that supports search space overbooking and pruning in accordance with aspects of the present disclosure.

FIG. 3 illustrates an example of a resource structure 300 that supports search space overbooking and pruning in accordance with various aspects of the present disclosure. Resource structure 300 may span two slots in the time domain, each of which may be subdivided into smaller units (e.g., mini-slots and/or symbols), and one or more units in the frequency domain (e.g., subcarriers). In some cases, resource structure 300 may be implemented by aspects of wireless communications systems 100 and/or 200.

In some wireless communication systems, a base station may transmit control information to a UE using one or more search space sets mapped within one or more CORESETs. In some cases, a control region may refer to a set of resources within monitoring occasion utilizing its own scrambling sequence (e.g., Demodulation Reference Signal (DMRS) scrambling sequence). The base station may transmit the control information in via one or more decoding candidates selected from search space sets having different aggregation levels. In some cases, the base station may additionally transmit an indication of the search space configuration to the UE. The UE may monitor one or more CORESETs for DCI from the base station according to the search space configuration. The UE may detect and blindly decode the decoding candidates of each search space to receive the control information.

As described above, in some cases, a pre-defined duration (e.g., a slot) may comprise none, or, one or more control regions, such as R0 305, R1/R2 310, R3 315, and R4 320. In some cases, different CORESETs may be considered to be different control regions, even if they partially or fully overlap. For instance, partially overlapping search space monitoring occasions (e.g., in time domain) may be counted separately, such as R0 305, R1/R2 310 (R1 and R2 fully overlap), and overlapping R0/R1/R2 325 (partial overlap between R0 and R1/R2). In the illustrated example, while R1 and R2 are fully overlapping, they are considered to be different CORESETs due to different DMRS scrambling sequences. Further, since R0 does not comprise the same CCEs as R1 and R2, it may not be considered to be the same control region as either R1 or R2, in spite of being from the same CORESET (i.e., sharing the same DMRS sequence) as one of them. Thus, different slots may comprise different number of control regions. Further, each control region within the slot may comprise zero, one, or more than one CSS sets, and zero, one, or more than one UE-specific search space sets.

Figure 4:
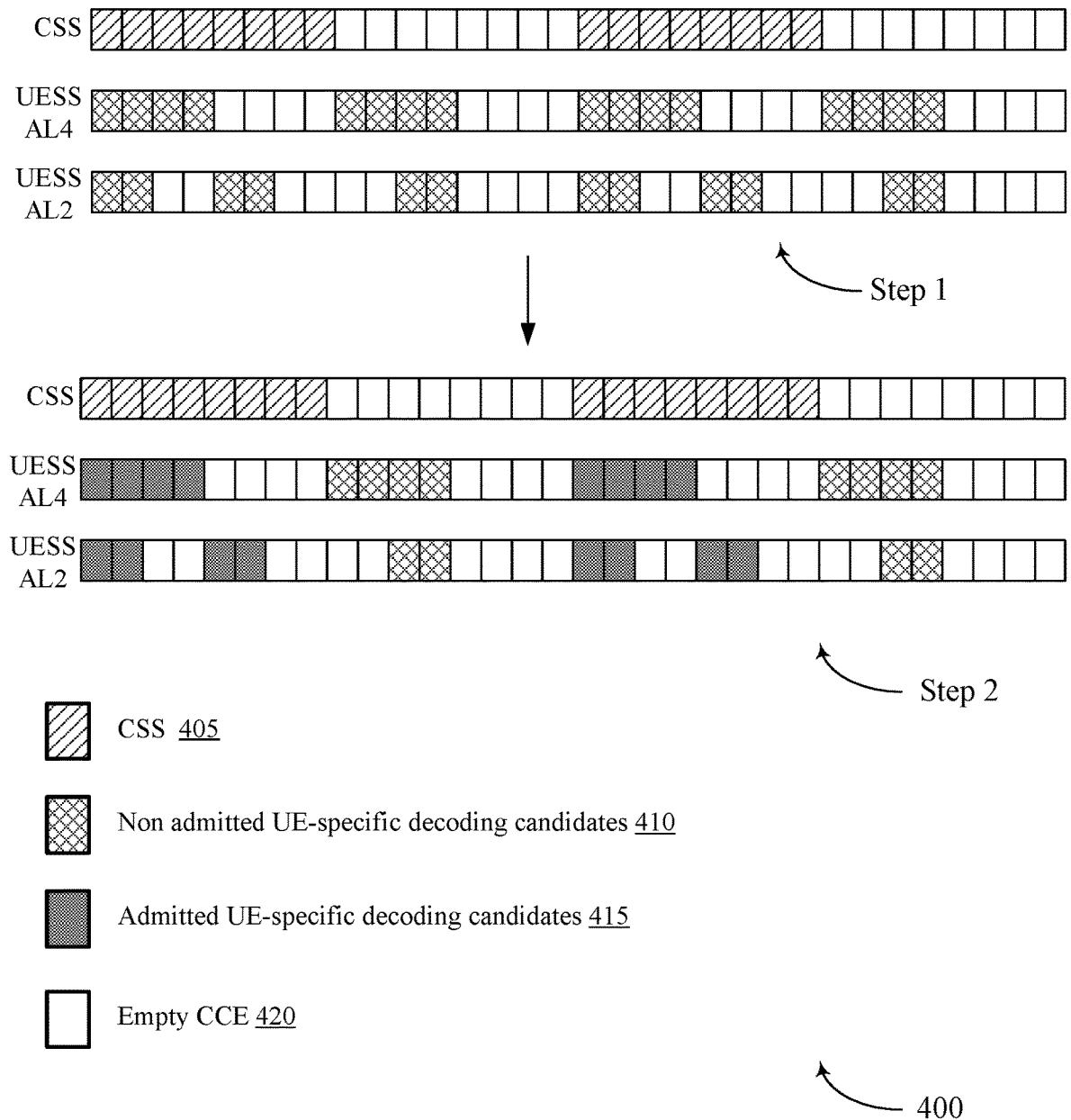
FIG. 4 illustrates an example of a control region that supports search space overbooking and pruning in accordance with aspects of the present disclosure.

FIG. 4 illustrates an example of a control region 400 that supports search space overbooking and pruning in accordance with aspects of the present disclosure. Control region 400 may support hashing, pruning, and free admission techniques, as described above with reference to FIGS. 1, 2, and 3. Control region 400 may comprise a CSS 405, and a USS set comprising UE-specific decoding candidates (e.g., one or more sets of UE-specific decoding candidates) of varying aggregation levels (e.g., AL4 and AL2). The CSS set may have two (2) AL8 common decoding candidates and the USS set may have four (4) AL4 UE-specific decoding candidates, and six (6) AL2 UE-specific decoding candidates.

In some cases, as illustrated in step 1, CSS 405 may be hashed to one or more CCEs in control region 400. In some cases, following pruning UE-specific decoding candidates from the USS set based on a blind decoding limitation, one or more UE-specific decoding candidates may be hashed to available CCEs of the control region 425. In some cases, the UE may jointly hash multiple UE-specific decoding candidates within the control region 400, for example, by combining decoding candidates of the one or more USS sets (e.g., by aggregation level), hashing the combination, and allocating the UE-specific decoding candidates to their respective USS sets. In some other cases, hashing may be performed independently for each USS set within the control region 400.

Following hashing, the location for each blind decode for the USS set within the control region 400 may be known. In some cases, as illustrated, the one or more UE-specific decoding candidates may be hashed to a first set of CCEs already hashed by CSS 405. In such cases, following comparing the first set of CCEs hashed by CSS 405 and the hashed CCE locations for the non-admitted UE-specific decoding candidates 410, the UE may determine that one or more UE-specific decoding candidates may be eligible to be admitted for blind decoding without impacting the CE limitation, due to fully overlapping hashed locations.

As illustrated in step 2, UE-specific decoding candidates 415 may be admitted for blind decoding based on a full overlap of their hashed CCE locations with the already hashed CSS set(s). In some cases, after step 2 there may be additional UE-specific decoding candidates not freely admitted for blind decoding based on overlap (i.e., no overlap or partial overlap) with common decoding candidates of the CSS set(s). In addition, some CCEs 420 may not have mapped decoding candidates for this USS set. These UE-specific decoding candidates may be admitted based in part on CE limitations (e.g., by using $Y-Y_C$), as further described with reference to FIGS. 5, 6, and 7. In some cases, a second pruning procedure may be employed by pruning one or more UE-specific decoding candidates based on the CE limitations. Further, free admission may be employed (similar to blind decoding) to maximize the number of UE-specific decoding candidates that may be used for CE and blind decoding. The second pruning procedure may employ an iterative pruning procedure, or non-iterative pruning procedure, in some cases. As previously described, it should be noted that, unlike free admission for blind decoding purposes, which may use one or more CCEs hashed by a common decoding candidate to fully overlap CCEs hashed by a UE-specific decoding candidate, channel estimation may be reused between common and UE-specific decoding candidates even for partially overlapping CCEs.

Figure 5:
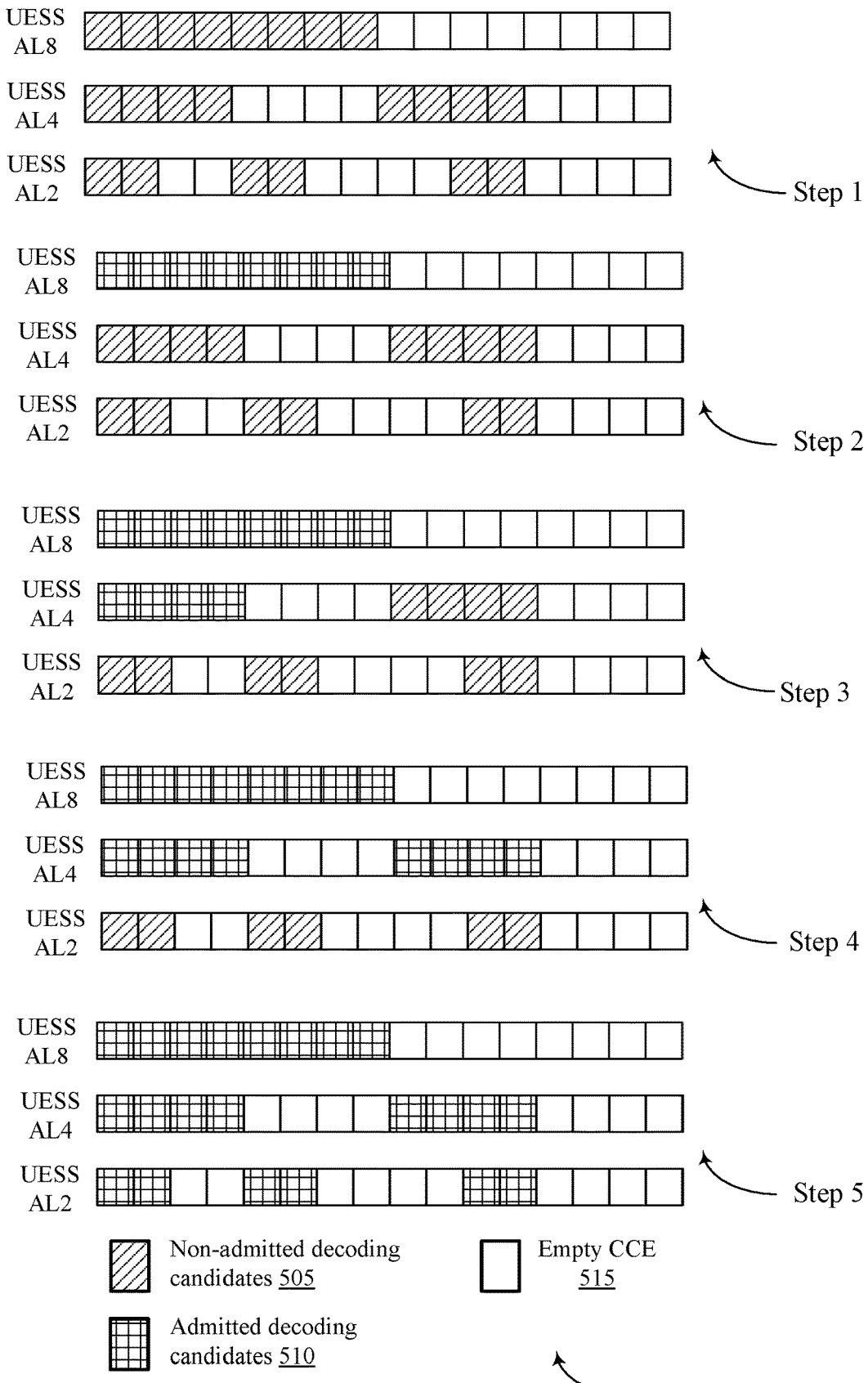
FIG. 5 illustrates an example of a control region that supports search space overbooking and pruning in accordance with aspects of the present disclosure.

FIG. 5 illustrates an example of a control region 500 that supports search space overbooking and pruning in accordance with aspects of the present disclosure. For example, FIG. 5 may illustrate an iterative pruning procedure. Control region 500 may support hashing, pruning, and free admission techniques, as described above with reference to FIGS. 1-4. Control region 500 may comprise a USS set comprising UE-specific decoding candidates (e.g., one or more sets of UE-specific decoding candidates) of varying aggregation levels (e.g., AL8, AL4, and AL2). For example, the USS set may include one (1) AL8 decoding candidate, two (2) AL4 decoding candidates, and three (3) AL2 decoding candidates.

Figure 7:
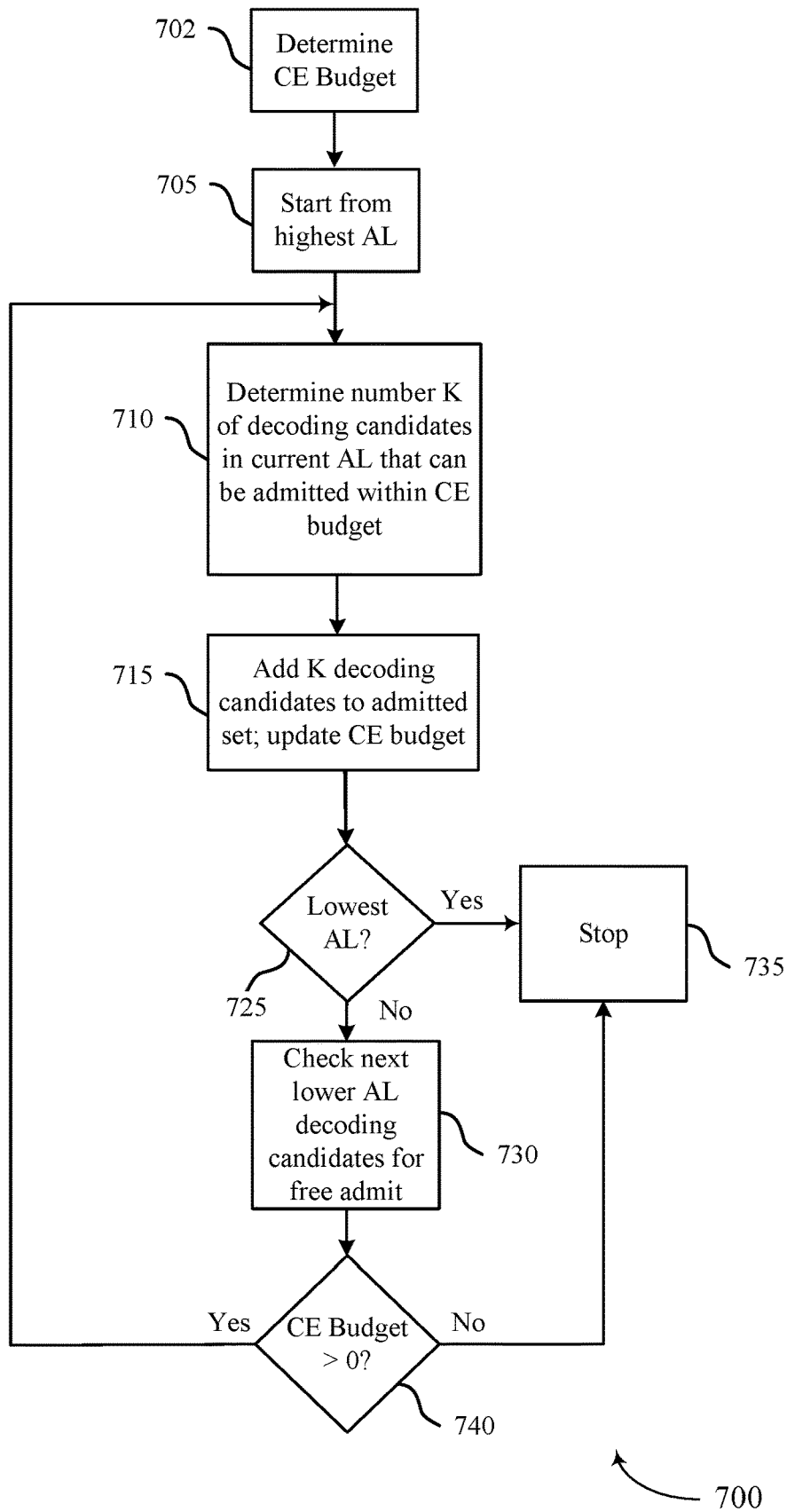
FIG. 7 illustrates an example of a flowchart that supports search space overbooking and pruning in accordance with aspects of the present disclosure.

FIG. 7 illustrates a flowchart 700 that supports search space overbooking and pruning in accordance with various aspects of the present disclosure. For example, FIG. 7 may illustrate an iterative pruning procedure based on CE limitation as shown by example in FIG. 5. In some cases, process in flowchart 700 may be implemented by aspects of wireless communication systems 100 and/or 200, and control region 500. Flowchart 700 illustrates UE or base station behavior in determining an applied decoding candidate set for one or more search space sets within a control region based on a channel estimation limitation.

As illustrated in step 1 of FIG. 5, all decoding candidates may initially be considered to be non-admitted candidates. At block 702 of FIG. 7, the UE or base station may proceed to determine the number of CCEs available for hashing the USS set (e.g., based on an allocated amount of the total number of CCEs available for hashing USS sets $Y-Y_C$). For example, the number of CCEs available for hashing the USS set may be proportional to a USS size of the USS set (e.g., a total number of CCEs used for hashing the USS set). Alternatively, the total number of CCEs available for hashing USS sets $Y-Y_C$ may be divided uniformly to the USS set(s). Yet alternatively, a minimum number of CCEs may be provided to each USS set, with a remainder of the total number of CCEs available for hashing USS sets $Y-Y_C$ divided uniformly or proportionally.

In some cases, admission of decoding candidates based on the number of CCEs available for hashing the USS set may be performed in an aggregation level order. For example, UE-specific decoding candidates of the highest AL (e.g., AL8 in FIG. 5) may be added first, due to a higher likelihood of decoding candidates of a lower AL (e.g., AL2 or AL4) being hashed to CCEs in the footprint of CCEs hashed by higher AL decoding candidates.

By way of example, FIG. 5 may illustrate an iterative pruning and free admission procedure for admitting UE-specific decoding candidates for blind decoding, based in part on a CE budget (e.g., allocated amount of the total number of CCEs available for hashing USS sets $Y-Y_C$). In this example, the CE budget is assumed to be 12 CCEs. At block 705 of FIG. 7, the UE or base station may start admitting UE-specific decoding candidates associated with the highest aggregation level. At block 710, the UE or base station may determine the number K of decoding candidates at the current AL that can be admitted while ensuring the CE budget is not exceeded may be determined.

At block 715, the UE or base station admits the K decoding candidates determined at block 710 and updates the CE budget. Thus, as illustrated at step 2 of FIG. 5, the UE or base station proceeds to admit one (1) AL8 decoding candidate and updates the CE budget to four (4) CCEs.

At block 725, the UE or base station checks if the current AL is the lowest AL. If it is the lowest AL, the process 700 stops at block 735. If not, the UE or base station may process the next lower AL (e.g., AL 4, if AL 8 is the current AL) for decoding candidates that can be freely admitted at block 730. Thus, as shown at step 3 of FIG. 5, the UE or base station may freely admit one (1) AL4 decoding candidate due to its hashed locations being fully overlapped by the admitted AL8 decoding candidates.

At block 740, the UE or base station determines if the CE budget is greater than zero (0). If the CE budget is zero, the process 700 stops at block 735. If the CE budget is greater than zero (0), the process returns to block 710 to process the next highest AL. For example, step 4 of FIG. 5 shows repeating the operations of step 2 at the next highest aggregation level, in this case AL4. Thus, the UE or base station may determine the number of AL4 decoding candidates that can be admitted while ensuring the updated CE budget (in this case four (4) CCEs) is not exceeded. Thus, the remaining AL4 decoding candidate is admitted, and the CE budget is updated to zero (0) CCEs. Step 5 is similar to step 3 for AL4, and thus three (3) AL2 decoding candidates may be admitted due to having their hashed locations overlapped by the admitted higher AL (i.e., AL 8 and/or AL 4) decoding candidates.

Figure 6:
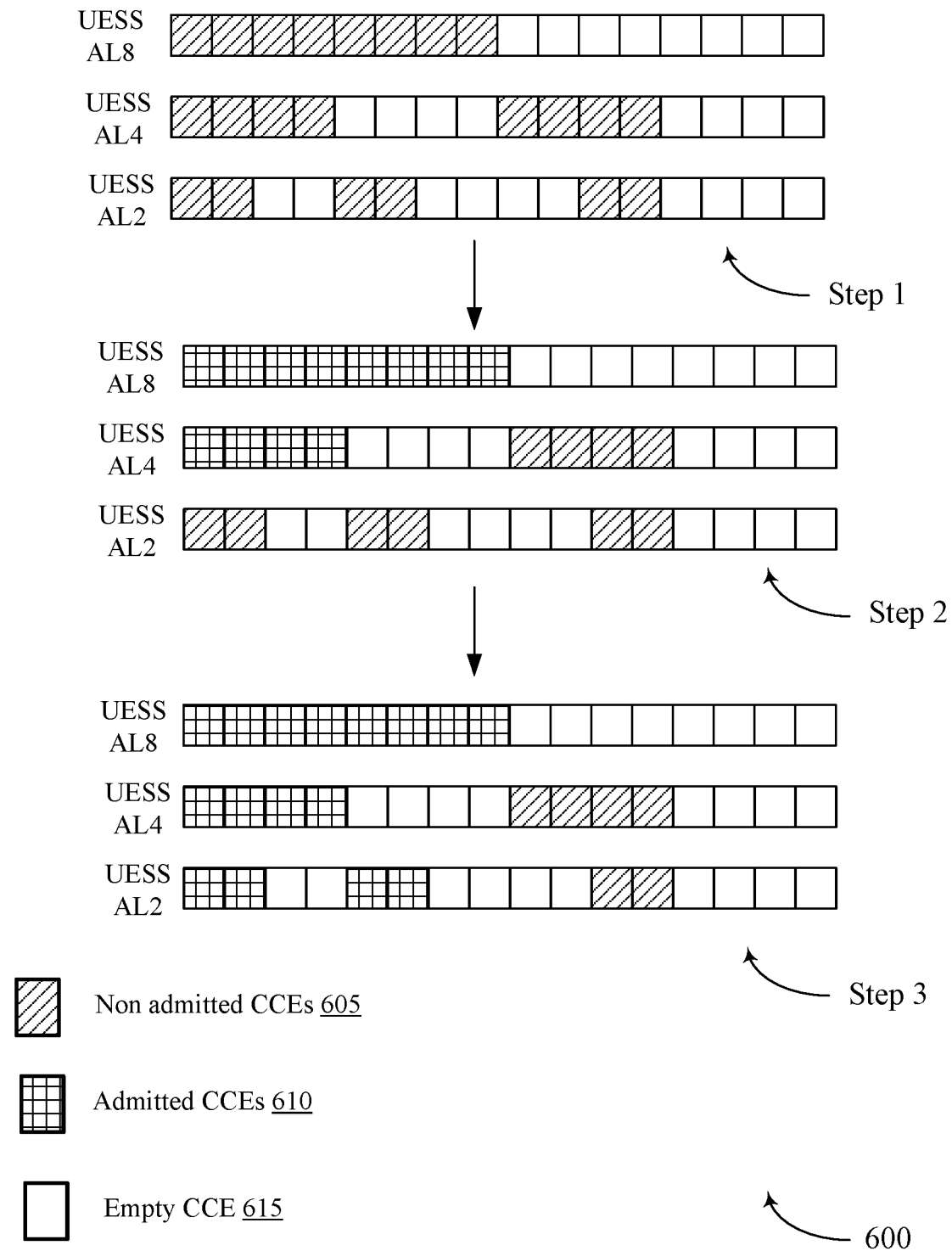
FIG. 6 illustrates an example of a control region that supports search space overbooking and pruning in accordance with aspects of the present disclosure.

FIG. 6 illustrates an example of a control region 600 that supports search space overbooking and pruning in accordance with aspects of the present disclosure. For example, FIG. 6 may illustrate a non-iterative pruning procedure. Control region 600 may support hashing, pruning, and free admission techniques, as described above with reference to FIGS. 1-4. Control region 600 may comprise a USS set comprising UE-specific decoding candidates (e.g., one or more sets of UE-specific decoding candidates) of varying aggregation levels (e.g., AL8, AL4, and AL2). For example, the USS set may include one (1) AL8 decoding candidate, two (2) AL4 decoding candidates, and three (3) AL2 decoding candidates.

As illustrated in step 1, all decoding candidates may initially be considered to be non-admitted candidates. At step 1, in some cases, the UE or base station may proceed to determine the number of CCEs available for hashing the USS set (e.g., based on an allocated amount of the total number of CCEs available for hashing USS sets $Y-Y_C$). For example, the number of CCEs available for hashing the USS set may be proportional to a USS size of the USS set (e.g., a total number of CCEs used for hashing the USS set). Alternatively, the total number of CCEs available for hashing USS sets $Y-Y_C$ may be divided uniformly amongst the USS set(s). Yet alternatively, a minimum number of CCEs may be provided to each USS set, with a remainder of the total number of CCEs available for hashing USS sets $Y-Y_C$ divided uniformly or proportionally.

At step 2, the admission steps may be performed based on the CE budget without considering free admission. For example, the number of AL8 decoding candidates that can be admitted while ensuring the CE budget is not exceeded may be determined. Thus, the UE or base station proceeds to admit one (1) AL8 decoding candidate, and updates the CE budget to four (4) CCEs. In some cases, the UE or base station may also check if the current AL is the lowest AL, and if not, may process admission of decoding candidates for the lower ALs using the remaining CE budget. For example, the UE or base station may determine the number of AL4 decoding candidates that can be admitted while ensuring the updated CE budget (in this case four (4) CCEs) is not exceeded. Thus, the first AL4 decoding candidate is admitted, and the CE budget is updated to zero (0) CCEs. Because the CE budget is exhausted, no other AL4 or AL2 candidates are admitted in step 2.

In step 3, the UE or base station may perform free admission of decoding candidates from all AL(s) lower than the lowest AL decoding candidates admitted in step 2 (in this case AL 2), (e.g., a lowest aggregation level that hashed to CCEs in step 2), based on an aggregate of CCEs for decoding candidates admitted in step 2. Thus, at step 3, the UE may freely admit two (2) AL2 decoding candidates. The remaining decoding candidates (in this case one (1) AL4 and one (1) AL2) will thus get pruned according to this example.

Figure 8:
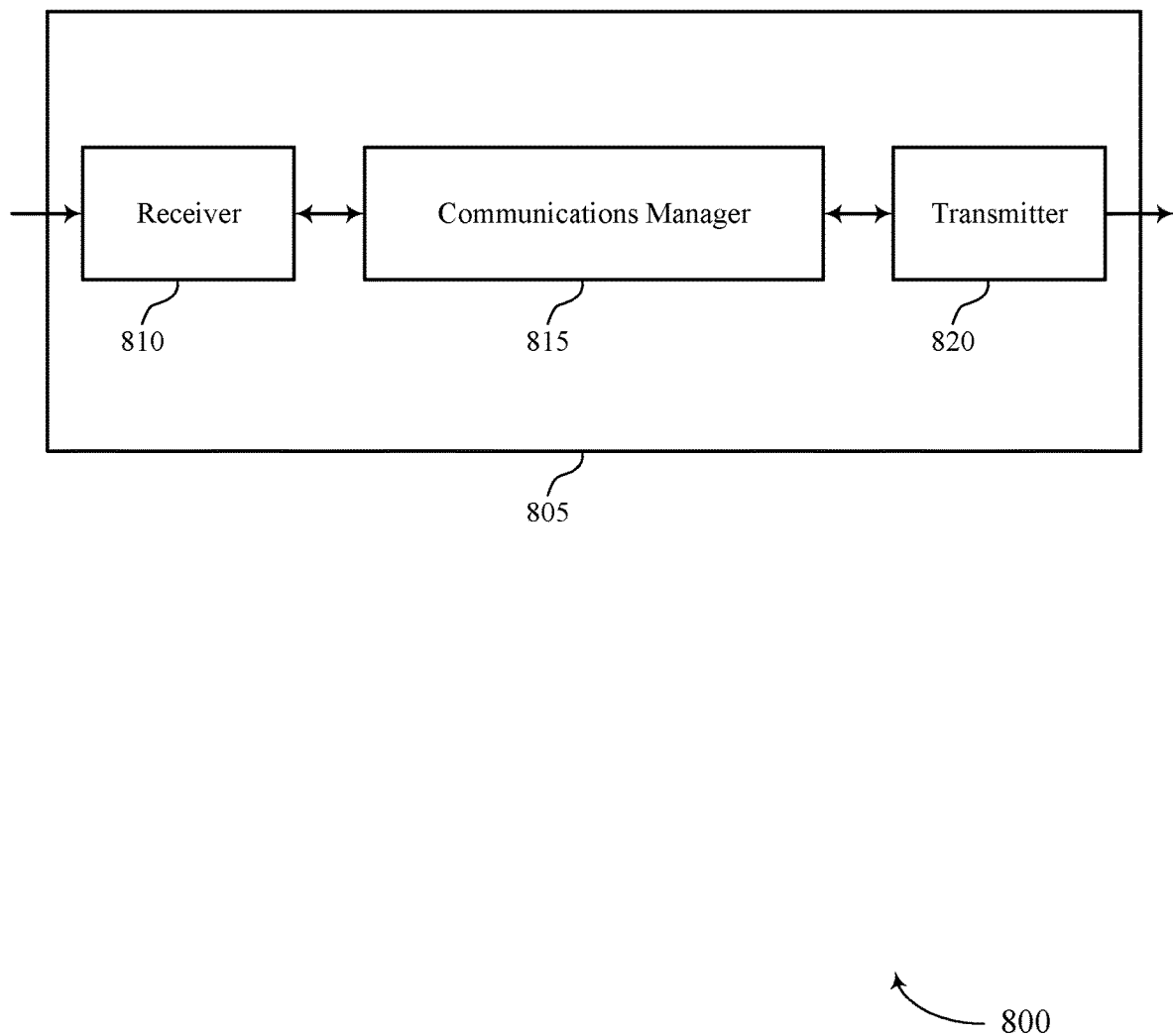
FIGS. 8 and 9 show block diagrams of devices that support search space overbooking and pruning in accordance with aspects of the present disclosure.

FIG. 8 shows a block diagram 800 of a device 805 that supports search space overbooking and pruning in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to search space overbooking and pruning, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify, for a control region of a control channel, one or more sets of decoding candidates associated with one or more search space sets, determine a total number of available CCEs for the one or more search space sets based on a CCE channel estimation limitation, determine respective numbers of available CCEs for the one or more search space sets based on the total number of available CCEs, determine an applied one or more sets of decoding candidates by hashing a first subset of the one or more sets of decoding candidates to a first subset of CCEs of the control region based on the respective numbers of available CCEs, and admitting a second subset of the one or more sets of decoding candidates having hashed locations overlapping with the first subset of CCEs, and monitor the control region for the applied one or more sets of decoding candidates. The communications manager 815 may be an example of aspects of the communications manager 1110 described with reference to FIG. 11.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
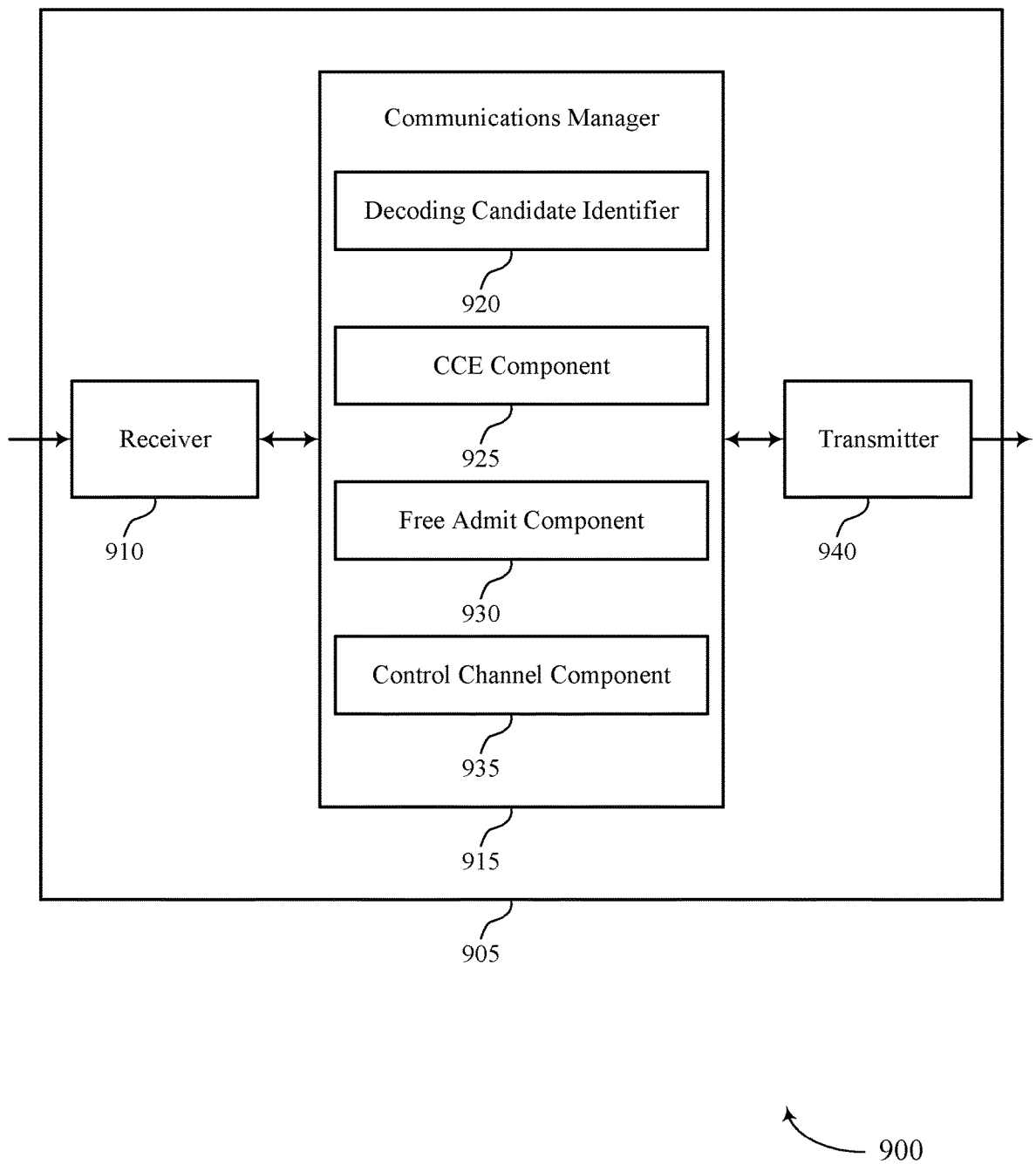

FIG. 9 shows a block diagram 900 of a device 905 that supports search space overbooking and pruning in accordance with aspects of the present disclosure. The device 905 may be an example of aspects of a device 805 or a UE 115 as described with reference to FIGS. 1 and 8. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to search space overbooking and pruning, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described with reference to FIG. 8. The communications manager 915 may include a decoding candidate identifier 920, a CCE component 925, a free admit component 930, and a control channel component 935. The communications manager 915 may be an example of aspects of the communications manager 1110 described with reference to FIG. 11.

The decoding candidate identifier 920 may identify, for a control region of a control channel, one or more sets of decoding candidates associated with one or more search space sets.

The CCE component 925 may determine a total number of available CCEs for the one or more search space sets based on a CCE channel estimation limitation and determine respective numbers of available CCEs for the one or more search space sets based on the total number of available CCEs.

The free admit component 930 may determine an applied one or more sets of decoding candidates by hashing a first subset of the one or more sets of decoding candidates to a first subset of CCEs of the control region based on the respective numbers of available CCEs, and admitting a second subset of the one or more sets of decoding candidates having hashed locations overlapping with the first subset of CCEs.

The control channel component 935 may monitor the control region for the applied one or more sets of decoding candidates.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
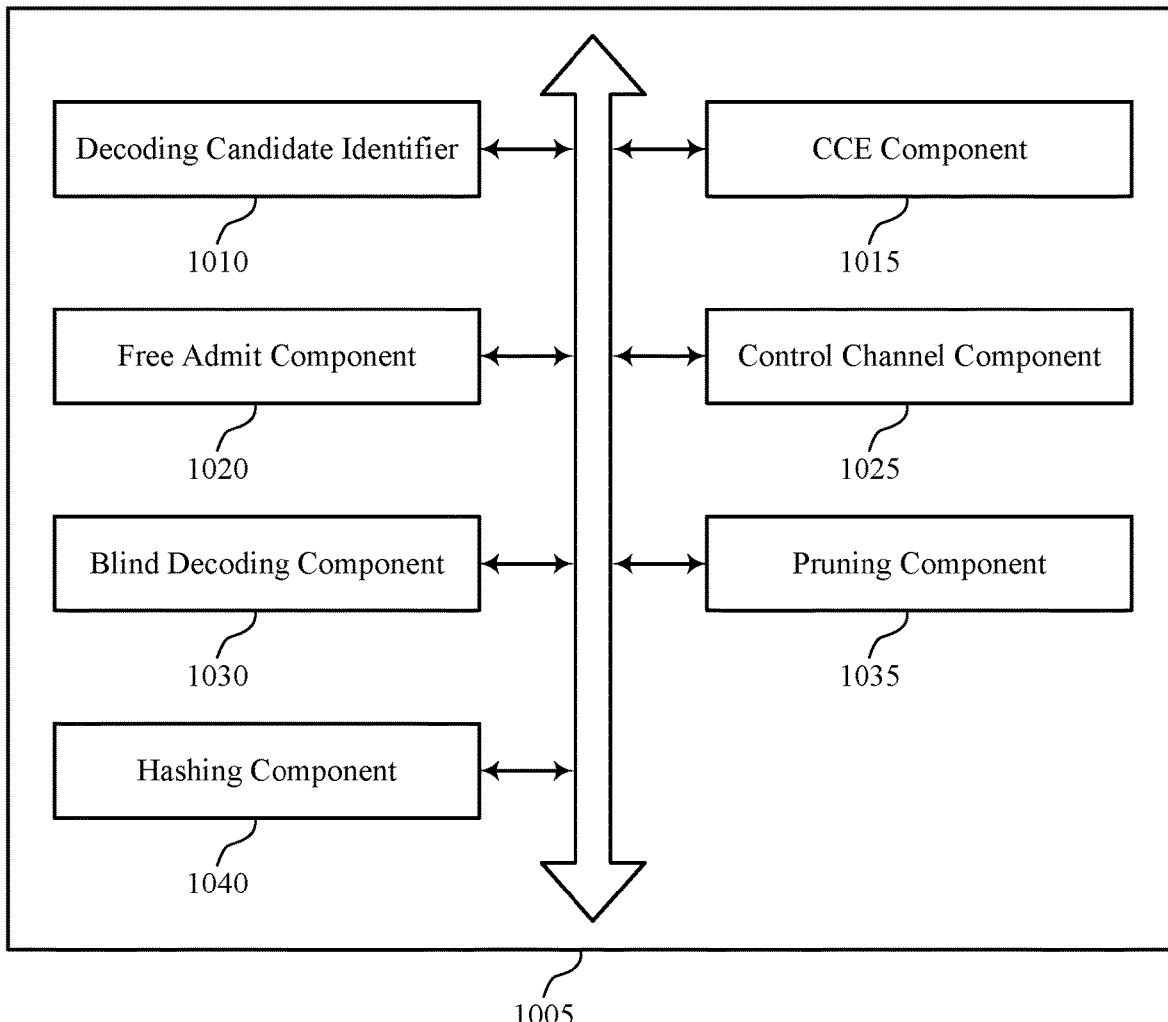
FIG. 10 shows a block diagram of a device that supports search space overbooking and pruning in accordance with aspects of the present disclosure.

FIG. 10 shows a block diagram 1000 of a communications manager 1005 that supports search space overbooking and pruning in accordance with aspects of the present disclosure. The communications manager 1005 may be an example of aspects of a communications manager 815, a communications manager 915, or a communications manager 1110 described with reference to FIGS. 8, 9, and 11. The communications manager 1005 may include a decoding candidate identifier 1010, a CCE component 1015, a free admit component 1020, a control channel component 1025, a blind decoding component 1030, a pruning component 1035, and a hashing component 1040. Each of these modules may communicate, directly or indirectly, with one another (e.g., via one or more buses).

The decoding candidate identifier 1010 may identify, for a control region of a control channel, one or more sets of decoding candidates associated with one or more search space sets.

In some examples, the decoding candidate identifier 1010 may identify, for the control region, a set of common decoding candidates associated with a common search space set.

In some examples, the decoding candidate identifier 1010 may identify decoding candidates of the each aggregation level spanning a number of CCEs less than or equal to a remaining number of the number of available CCEs.

In some examples, the decoding candidate identifier 1010 may identify, for each aggregation level from a highest aggregation level to a lowest aggregation level of the each of the one or more search space sets, decoding candidates of the each aggregation level spanning a number of CCEs less than or equal to a remaining number of the number of available CCEs.

The CCE component 1015 may determine a total number of available CCEs for the one or more search space sets based on a CCE channel estimation limitation.

In some examples, the CCE component 1015 may determine respective numbers of available CCEs for the one or more search space sets based on the total number of available CCEs.

In some examples, the CCE component 1015 may allocate the total number of available CCEs to the one or more search space sets in proportion to respective numbers of CCEs spanned by respective sets of decoding candidates in the one or more search space sets.

In some examples, the CCE component 1015 may uniformly allocate the total number of available CCEs to the one or more search space sets.

In some examples, the CCE component 1015 may allocate a minimum number of CCEs to each of the one or more search space sets.

In some examples, the CCE component 1015 may allocate the total number of available CCEs to the one or more search space sets based on an aggregation level size of decoding candidates in the one or more search space sets.

The free admit component 1020 may determine an applied one or more sets of decoding candidates by hashing a first subset of the one or more sets of decoding candidates to a first subset of CCEs of the control region based on the respective numbers of available CCEs, and admitting a second subset of the one or more sets of decoding candidates having hashed locations overlapping with the first subset of CCEs.

In some examples, the free admit component 1020 may include (or admit) decoding candidates of a next aggregation level lower than the each aggregation level that hash to CCEs of the first subset of CCEs. In some other examples, the free admit component 1020 may include (or admit) decoding candidates of aggregation levels lower than a lowest aggregation level that hashed to CCEs of the first subset of CCEs.

In some examples, the free admit component 1020 may admit, prior to the admitting the second subset of the one or more sets of decoding candidates, a third subset of the one or more sets of decoding candidates having hashed locations overlapping with the second subset of CCEs.

The control channel component 1025 may monitor the control region for the applied one or more sets of decoding candidates.

The blind decoding component 1030 may determine a total number of available blind decodes for the one or more search space sets based on a blind decoding limitation of the UE.

In some examples, the blind decoding component 1030 may determine respective numbers of available blind decodes for the one or more search space sets based on the total number of available blind decodes.

The pruning component 1035 may prune the one or more sets of decoding candidates based on the respective numbers of available blind decodes for the one or more search space sets.

In some cases, the determining the respective numbers of available blind decodes includes allocating the total number of available blind decodes for the one or more search space sets to the one or more search space sets in proportion to respective numbers of decoding candidates in the one or more search space sets.

In some cases, the determining the respective numbers of available blind decodes includes uniformly allocating the total number of available blind decodes to the one or more search space sets.

In some cases, the determining the respective numbers of available blind decodes includes allocating a minimum number of blind decodes to each of the one or more search space sets.

The hashing component 1040 may hash the set of common decoding candidates to a second subset of CCEs of the control region, where the total number of available blind decodes is determined based on a number of decoding candidates of the set of common decoding candidates and the blind decoding limitation of the UE.

In some examples, the hashing component 1040 may hash the identified decoding candidates to CCEs of the first subset of CCEs.

In some examples, the hashing component 1040 may hash the set of common decoding candidates to a second subset of CCEs of the control region, where the total number of available CCEs is determined based on the CCE channel estimation limitation and a number of CCEs of the second subset of CCEs.

Figure 11:
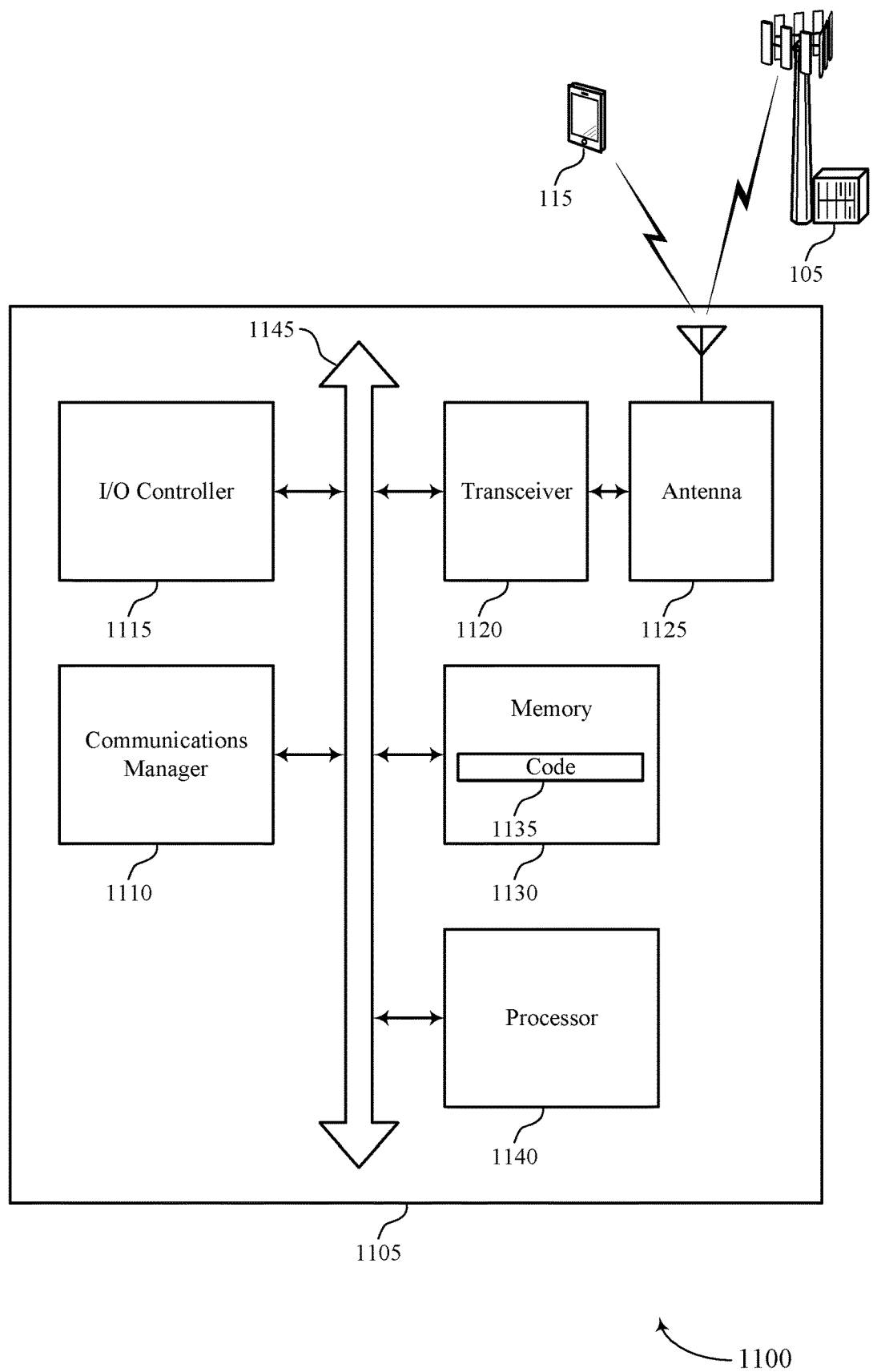
FIG. 11 shows a diagram of a system including a device that supports search space overbooking and pruning in accordance with aspects of the present disclosure.

FIG. 11 shows a diagram of a system 1100 including a device 1105 that supports search space overbooking and pruning in accordance with aspects of the present disclosure. The device 1105 may be an example of or include the components of device 805, device 905, or a UE 115 as described above, e.g., with reference to FIGS. 1, 8, and 9. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may identify, for a control region of a control channel, one or more sets of decoding candidates associated with one or more search space sets, determine a total number of available CCEs for the one or more search space sets based on a CCE channel estimation limitation, determine respective numbers of available CCEs for the one or more search space sets based on the total number of available CCEs, determine an applied one or more sets of decoding candidates by hashing a first subset of the one or more sets of decoding candidates to a first subset of CCEs of the control region based on the respective numbers of available CCEs, and admitting a second subset of the one or more sets of decoding candidates having hashed locations overlapping with the first subset of CCEs, and monitor the control region for the applied one or more sets of decoding candidates.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting search space overbooking and pruning).

The code 1135 may include instructions to implement aspects of the present disclosure, including instructions to support wireless communication. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
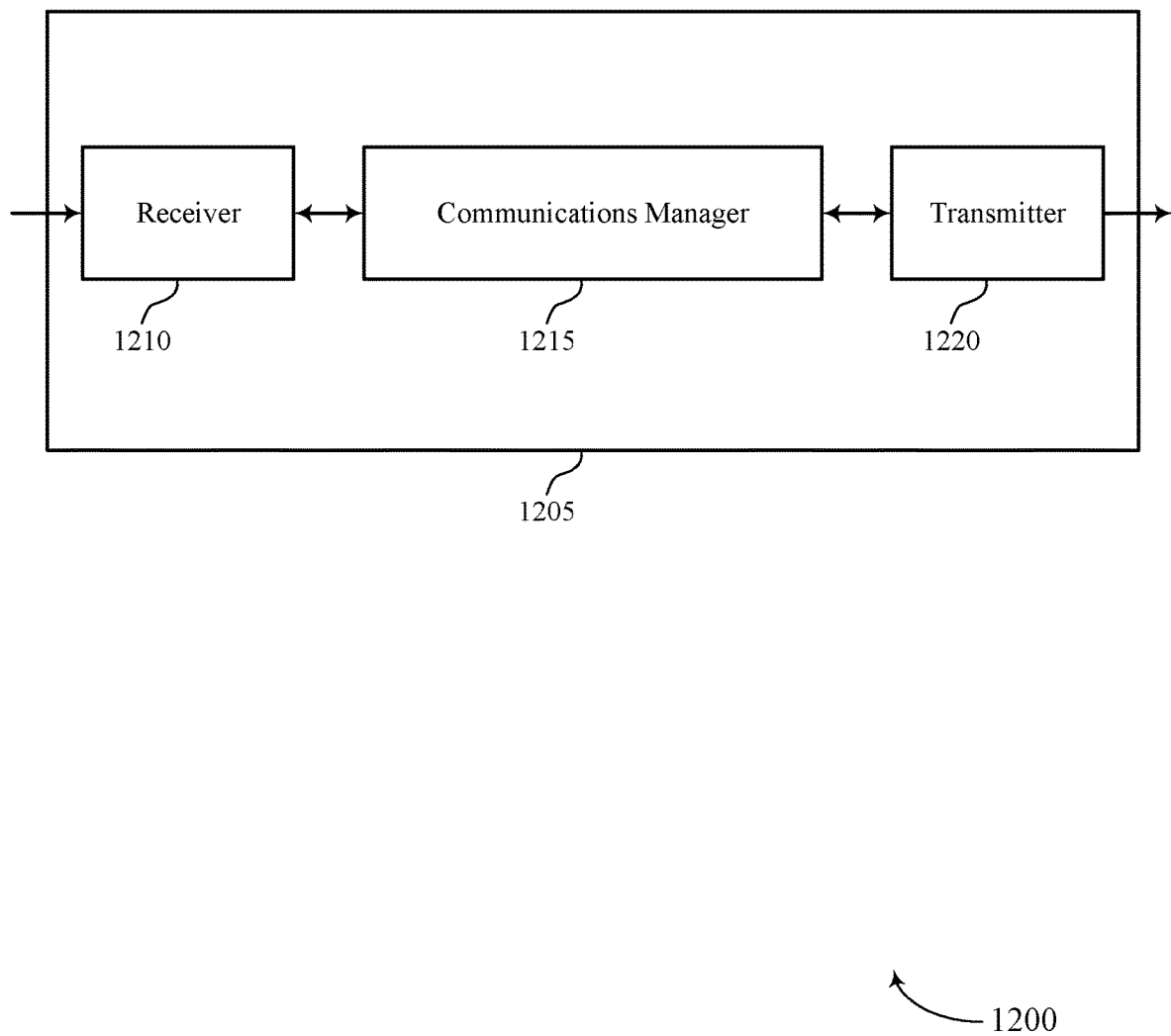
FIGS. 12 and 13 show block diagrams of devices that support search space overbooking and pruning in accordance with aspects of the present disclosure.

FIG. 12 shows a block diagram 1200 of a device 1205 that supports search space overbooking and pruning in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to search space overbooking and pruning, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may identify, for a control region of a control channel, one or more sets of decoding candidates associated with one or more search space sets, determine a total number of available CCEs for the one or more search space sets based on a CCE channel estimation limitation, determine respective numbers of available CCEs for the one or more search space sets based on the total number of available CCEs, determine an applied one or more sets of decoding candidates by hashing a first subset of the one or more sets of decoding candidates to a first subset of CCEs of the control region based on the number of available CCEs, and admitting a second subset of the one or more sets of decoding candidates having hashed locations overlapping with the first subset of CCEs, and transmit control information to the UE via the control channel. The communications manager 1215 may be an example of aspects of the communications manager 1510 described with reference to FIG. 15.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
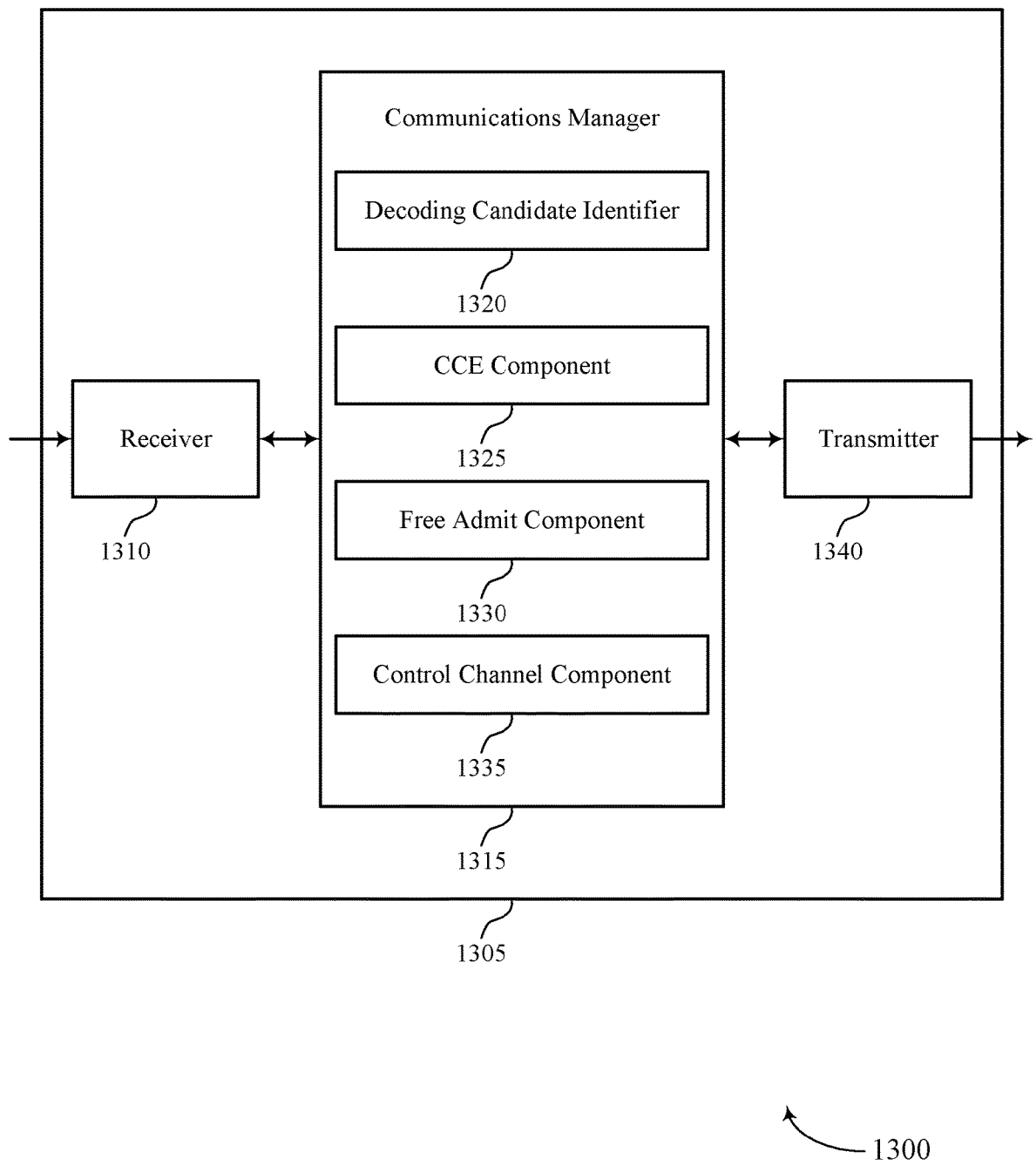

FIG. 13 shows a block diagram 1300 of a device 1305 that supports search space overbooking and pruning in accordance with aspects of the present disclosure. The device 1305 may be an example of aspects of a device 1205 or a base station 105 as described with reference to FIGS. 1 and 12. The device 1305 may include a receiver 1310, a communications manager 1315, and a transmitter 1340. The device 1305 may also include a processor. Each of these components may be in communication with one another (e.g., via one or more buses).

The receiver 1310 may receive information such as packets, user data, or control information associated with various information channels (e.g., control channels, data channels, and information related to search space overbooking and pruning, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described with reference to FIG. 12. The communications manager 1315 may include a decoding candidate identifier 1320, a CCE component 1325, a free admit component 1330, and a control channel component 1335. The communications manager 1315 may be an example of aspects of the communications manager 1510 described with reference to FIG. 15.

The decoding candidate identifier 1320 may identify, for a control region of a control channel, one or more sets of decoding candidates associated with one or more search space sets.

The CCE component 1325 may determine a total number of available CCEs for the one or more search space sets based on a CCE channel estimation limitation and determine respective numbers of available CCEs for the one or more search space sets based on the total number of available CCEs.

The free admit component 1330 may determine an applied one or more sets of decoding candidates by hashing a first subset of the one or more sets of decoding candidates to a first subset of CCEs of the control region based on the number of available CCEs, and admitting a second subset of the one or more sets of decoding candidates having hashed locations overlapping with the first subset of CCEs.

The control channel component 1335 may transmit control information to the UE via the control channel.

The transmitter 1340 may transmit signals generated by other components of the device 1305. In some examples, the transmitter 1340 may be collocated with a receiver 1310 in a transceiver module. For example, the transmitter 1340 may be an example of aspects of the transceiver 1520 described with reference to FIG. 15. The transmitter 1340 may utilize a single antenna or a set of antennas.

Figure 14:
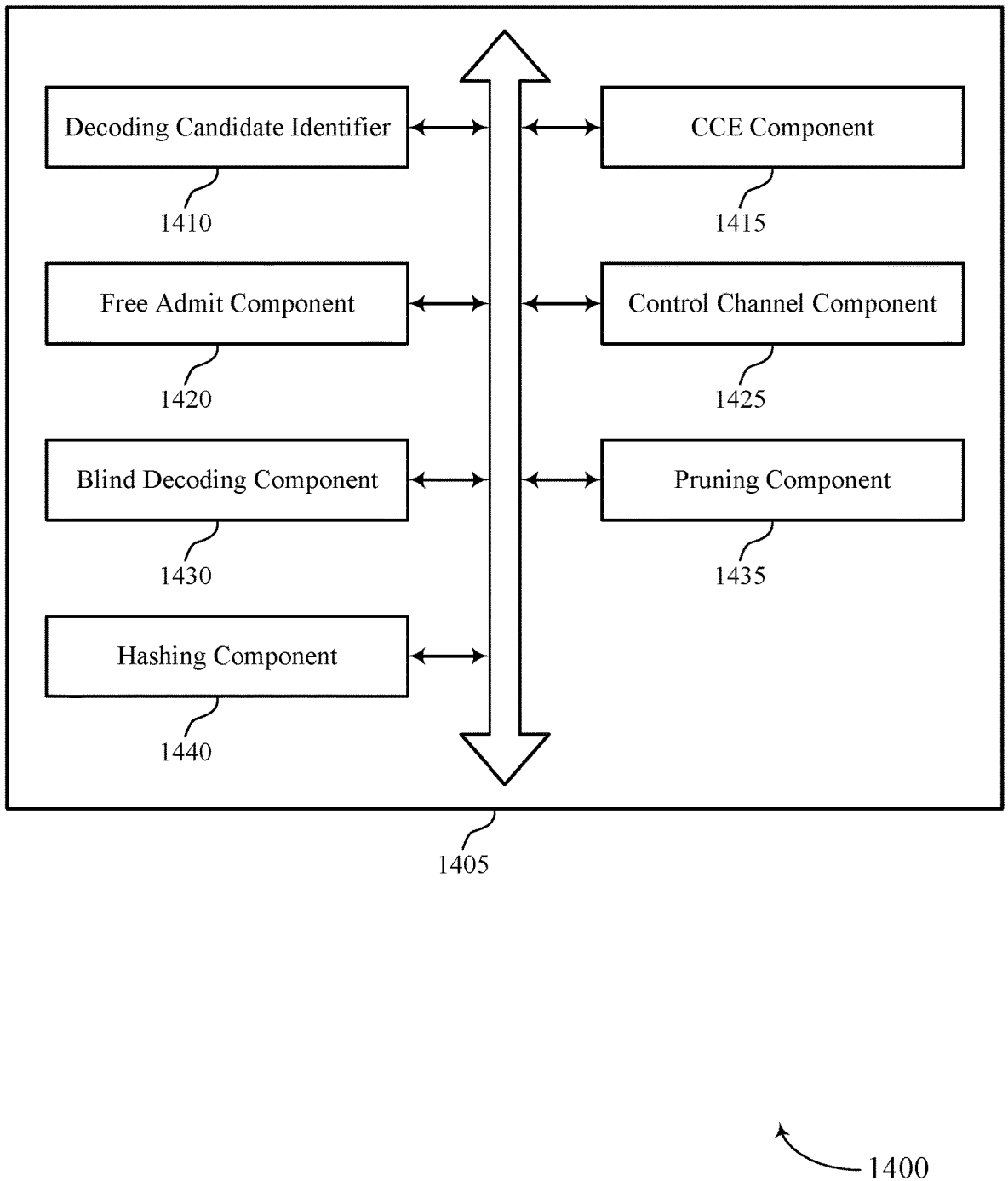
FIG. 14 shows a block diagram of a device that supports search space overbooking and pruning in accordance with aspects of the present disclosure.

FIG. 14 shows a block diagram 1400 of a communications manager 1405 that supports search space overbooking and pruning in accordance with aspects of the present disclosure. The communications manager 1405 may be an example of aspects of a communications manager 1215, a communications manager 1315, or a communications manager 1510 described with reference to FIGS. 12, 13, and 15. The communications manager 1405 may include a decoding candidate identifier 1410, a CCE component 1415, a free admit component 1420, a control channel component 1425, a blind decoding component 1430, a pruning component 1435, and a hashing component 1440. Each of these modules may communicate, directly or indirectly, with one another (e.g., via one or more buses).

The decoding candidate identifier 1410 may identify, for a control region of a control channel, one or more sets of decoding candidates associated with one or more search space sets.

In some examples, the decoding candidate identifier 1410 may identify, for the control region, a set of common decoding candidates associated with a common search space set.

In some examples, the decoding candidate identifier 1410 may identify decoding candidates of the each aggregation level spanning a number of CCEs less than or equal to a remaining number of the number of available CCEs.

In some examples, the decoding candidate identifier 1410 may identify, for each aggregation level from a highest aggregation level to a lowest aggregation level of the each of the one or more search space sets, decoding candidates of the each aggregation level spanning a number of CCEs less than or equal to a remaining number of the number of available CCEs.

The CCE component 1415 may determine a total number of available CCEs for the one or more search space sets based on a CCE channel estimation limitation.

In some examples, the CCE component 1415 may determine respective numbers of available CCEs for the one or more search space sets based on the total number of available CCEs.

In some examples, the CCE component 1415 may allocate the total number of available CCEs to the one or more search space sets in proportion to respective numbers of CCEs spanned by respective sets of decoding candidates in the one or more search space sets.

In some examples, the CCE component 1415 may uniformly allocate the total number of available CCEs to the one or more search space sets.

In some examples, the CCE component 1415 may allocate a minimum number of CCEs to each of the one or more search space sets.

In some examples, the CCE component 1415 may allocate the total number of available CCEs to the one or more search space sets based on an aggregation level size of decoding candidates in the one or more search space sets.

The free admit component 1420 may determine an applied one or more sets of decoding candidates by hashing a first subset of the one or more sets of decoding candidates to a first subset of CCEs of the control region based on the number of available CCEs, and admitting a second subset of the one or more sets of decoding candidates having hashed locations overlapping with the first subset of CCEs.

In some examples, the free admit component 1420 may include (or admit) decoding candidates of a next aggregation level lower than the each aggregation level that hash to CCEs of the first subset of CCEs. In some other examples, the free admit component 1420 may include (or admit) decoding candidates of aggregation levels lower than a lowest aggregation level that hashed to CCEs of the first subset of CCEs.

In some examples, the free admit component 1420 may admit, prior to the admitting the second subset of the one or more sets of decoding candidates, a third subset of the one or more sets of decoding candidates having hashed locations overlapping with the second subset of CCEs.

The control channel component 1425 may transmit control information to the UE via the control channel.

The blind decoding component 1430 may determine a total number of available blind decodes for the one or more search space sets based on a blind decoding limitation of the UE.

In some examples, the blind decoding component 1430 may determine respective numbers of available blind decodes for the one or more search space sets based on the total number of available blind decodes.

The pruning component 1435 may prune the one or more sets of decoding candidates based on the respective numbers of available blind decodes for the one or more search space sets.

In some cases, the determining the respective numbers of available blind decodes includes allocating the total number of available blind decodes for the one or more search space sets to the one or more search space sets in proportion to respective numbers of decoding candidates in the one or more search space sets.

In some cases, the determining the respective numbers of available blind decodes includes uniformly allocating the total number of available blind decodes to the one or more search space sets.

In some cases, the determining the respective numbers of available blind decodes includes allocating a minimum number of blind decodes to each of the one or more search space sets.

The hashing component 1440 may hash the set of common decoding candidates to a second subset of CCEs of the control region, where the total number of available blind decodes is determined based on a number decoding candidates of the set of common decoding candidates and the blind decoding limitation of the UE.

In some examples, the hashing component 1440 may hash the identified decoding candidates to CCEs of the first subset of CCEs.

In some examples, the hashing component 1440 may hash the set of common decoding candidates to a second subset of CCEs of the control region, where the total number of available CCEs is determined based on the CCE channel estimation limitation and a number of CCEs of the second subset of CCEs.

Figure 15:
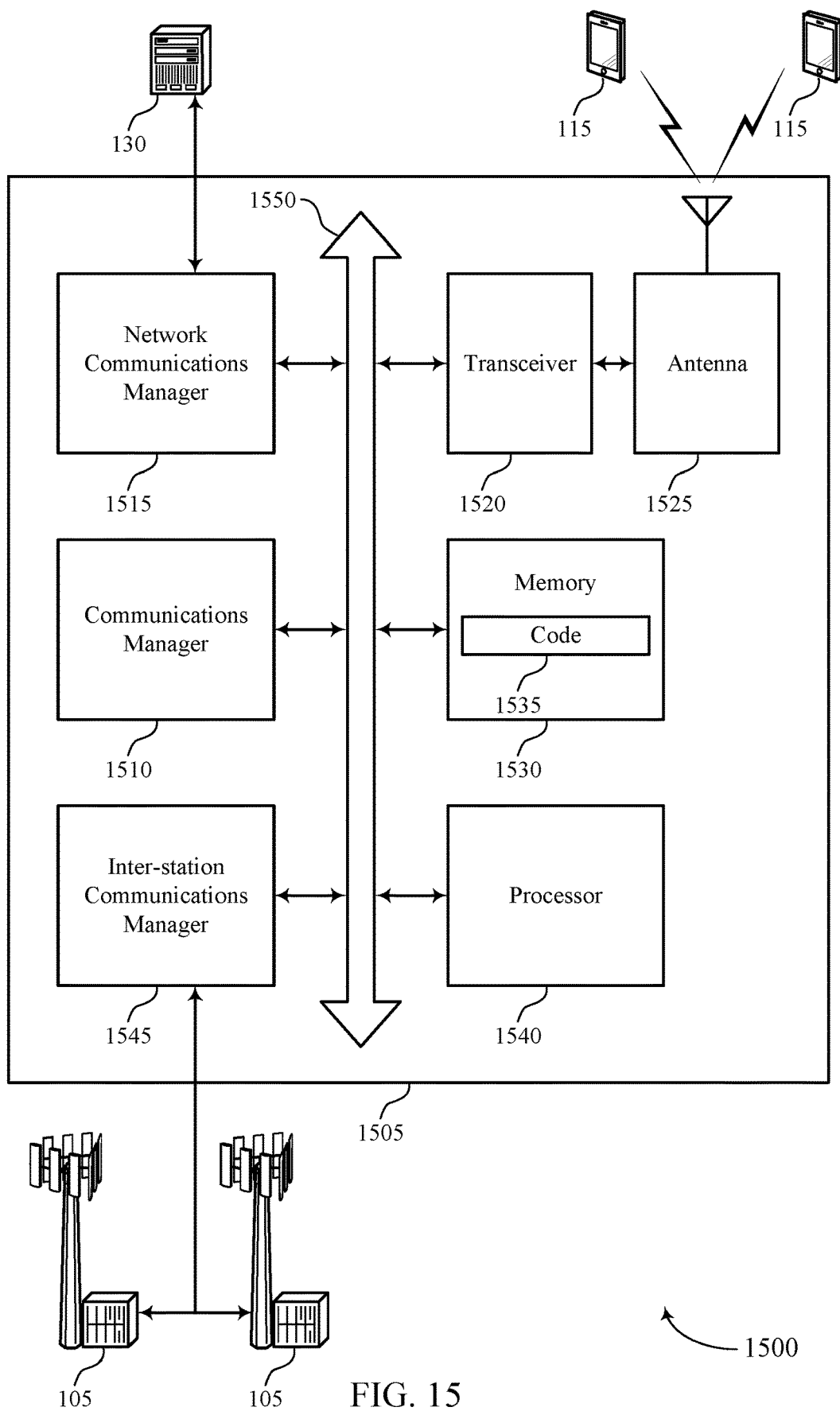
FIG. 15 shows a diagram of a system including a device that supports search space overbooking and pruning in accordance with aspects of the present disclosure.

FIG. 15 shows a diagram of a system 1500 including a device 1505 that supports search space overbooking and pruning in accordance with aspects of the present disclosure. The device 1505 may be an example of or include the components of device 1205, device 1305, or a base station 105 as described above, e.g., with reference to FIGS. 1, 12, and 13. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may identify, for a control region of a control channel, one or more sets of decoding candidates associated with one or more search space sets, determine a total number of available CCEs for the one or more search space sets based on a CCE channel estimation limitation, determine respective numbers of available CCEs for the one or more search space sets based on the total number of available CCEs, determine an applied one or more sets of decoding candidates by hashing a first subset of the one or more sets of decoding candidates to a first subset of CCEs of the control region based on the number of available CCEs, and admitting a second subset of the one or more sets of decoding candidates having hashed locations overlapping with the first subset of CCEs, and transmit control information to the UE via the control channel.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting search space overbooking and pruning).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communication. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
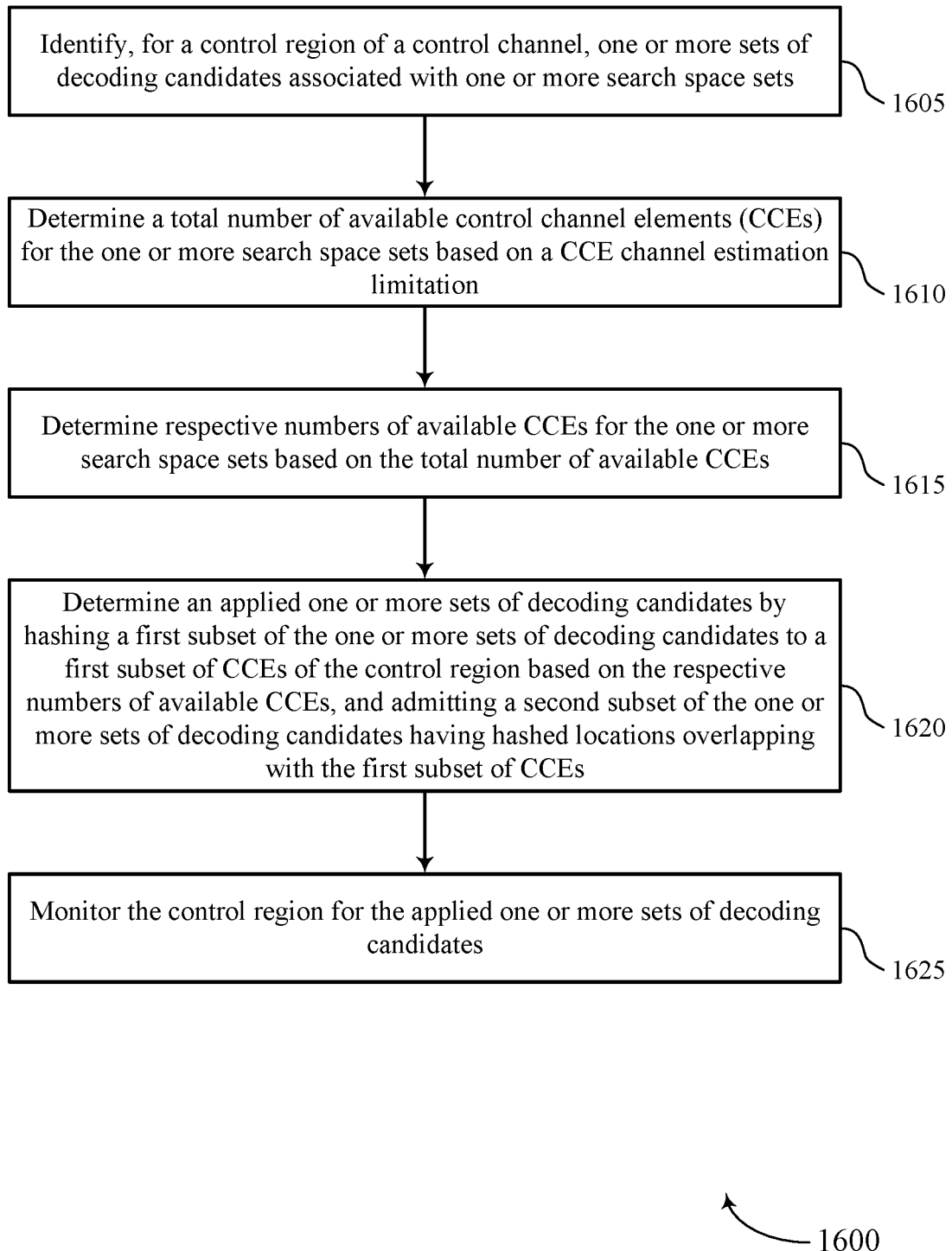
FIGS. 16 and 17 show flowcharts illustrating methods that support search space overbooking and pruning in accordance with aspects of the present disclosure.

FIG. 16 shows a flowchart illustrating a method 1600 that supports search space overbooking and pruning in accordance with aspects of the present disclosure. The operations of method 1600 may be implemented by a UE 115 or its components as described herein. For example, the operations of method 1600 may be performed by a communications manager as described with reference to FIGS. 8 to 11. In some examples, a UE may execute a set of instructions to control the functional elements of the UE to perform the functions described below. Additionally or alternatively, a UE may perform aspects of the functions described below using special-purpose hardware.

At 1605, the UE may identify, for a control region of a control channel, one or more sets of decoding candidates associated with one or more search space sets. The operations of 1605 may be performed according to the methods described herein. In some examples, aspects of the operations of 1605 may be performed by a decoding candidate identifier as described with reference to FIGS. 8 to 11.

At 1610, the UE may determine a total number of available CCEs for the one or more search space sets based on a CCE channel estimation limitation. The operations of 1610 may be performed according to the methods described herein. In some examples, aspects of the operations of 1610 may be performed by a CCE component as described with reference to FIGS. 8 to 11.

At 1615, the UE may determine respective numbers of available CCEs for the one or more search space sets based on the total number of available CCEs. The operations of 1615 may be performed according to the methods described herein. In some examples, aspects of the operations of 1615 may be performed by a CCE component as described with reference to FIGS. 8 to 11.

At 1620, the UE may determine an applied one or more sets of decoding candidates by hashing a first subset of the one or more sets of decoding candidates to a first subset of CCEs of the control region based on the respective numbers of available CCEs, and admitting a second subset of the one or more sets of decoding candidates having hashed locations overlapping with the first subset of CCEs. The operations of 1620 may be performed according to the methods described herein. In some examples, aspects of the operations of 1620 may be performed by a free admit component as described with reference to FIGS. 8 to 11.

At 1625, the UE may monitor the control region for the applied one or more sets of decoding candidates. The operations of 1625 may be performed according to the methods described herein. In some examples, aspects of the operations of 1625 may be performed by a control channel component as described with reference to FIGS. 8 to 11.

Figure 17:
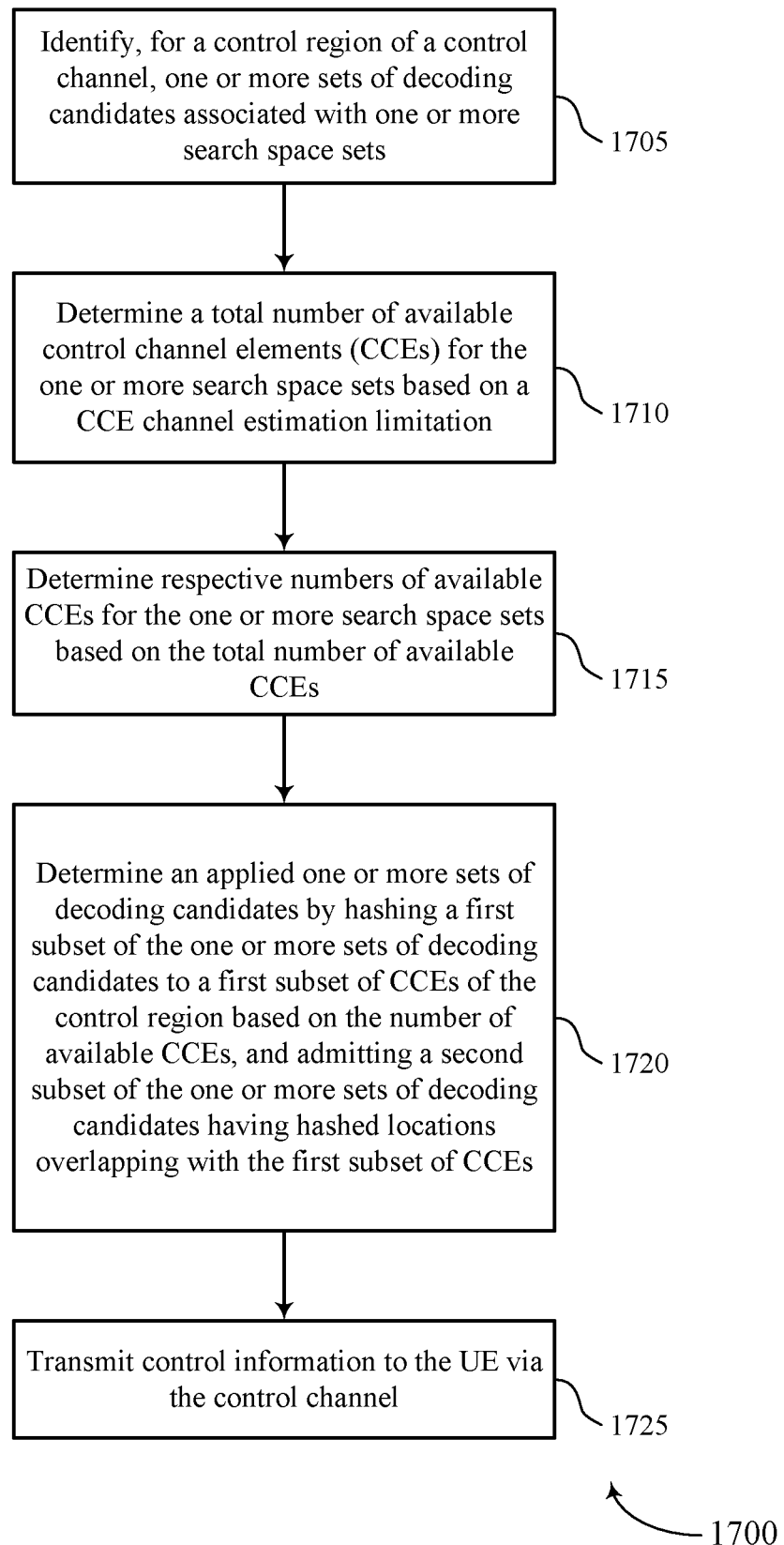

FIG. 17 shows a flowchart illustrating a method 1700 that supports search space overbooking and pruning in accordance with aspects of the present disclosure. The operations of method 1700 may be implemented by a base station 105 or its components as described herein. For example, the operations of method 1700 may be performed by a communications manager as described with reference to FIGS. 12 to 15. In some examples, a base station may execute a set of instructions to control the functional elements of the base station to perform the functions described below. Additionally or alternatively, a base station may perform aspects of the functions described below using special-purpose hardware.

At 1705, the base station may identify, for a control region of a control channel, one or more sets of decoding candidates associated with one or more search space sets. The operations of 1705 may be performed according to the methods described herein. In some examples, aspects of the operations of 1705 may be performed by a decoding candidate identifier as described with reference to FIGS. 12 to 15.

At 1710, the base station may determine a total number of available CCEs for the one or more search space sets based on a CCE channel estimation limitation. The operations of 1710 may be performed according to the methods described herein. In some examples, aspects of the operations of 1710 may be performed by a CCE component as described with reference to FIGS. 12 to 15.

At 1715, the base station may determine respective numbers of available CCEs for the one or more search space sets based on the total number of available CCEs. The operations of 1715 may be performed according to the methods described herein. In some examples, aspects of the operations of 1715 may be performed by a CCE component as described with reference to FIGS. 12 to 15.

At 1720, the base station may determine an applied one or more sets of decoding candidates by hashing a first subset of the one or more sets of decoding candidates to a first subset of CCEs of the control region based on the number of available CCEs, and admitting a second subset of the one or more sets of decoding candidates having hashed locations overlapping with the first subset of CCEs. The operations of 1720 may be performed according to the methods described herein. In some examples, aspects of the operations of 1720 may be performed by a free admit component as described with reference to FIGS. 12 to 15.

At 1725, the base station may transmit control information to the UE via the control channel. The operations of 1725 may be performed according to the methods described herein. In some examples, aspects of the operations of 1725 may be performed by a control channel component as described with reference to FIGS. 12 to 15.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Fast low-latency access with seamless handoff orthogonal frequency division multiplexing (Flash-OFDM), etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying, for a control region of a control channel, one or more sets of decoding candidates associated with one or more search space sets;
    determining a total number of available control channel elements (CCEs) for the one or more search space sets based at least in part on a CCE channel estimation limitation;
    determining respective numbers of available CCEs for the one or more search space sets based at least in part on the total number of available CCEs;
    determining an applied one or more sets of decoding candidates by hashing a first subset of the one or more sets of decoding candidates to a first subset of CCEs of the control region based at least in part on the respective numbers of available CCEs, and admitting a second subset of the one or more sets of decoding candidates having hashed locations overlapping with the first subset of CCEs; and
    monitoring the control region for the applied one or more sets of decoding candidates.

2. The method of claim 1, further comprising:
    determining a total number of available blind decodes for the one or more search space sets based at least in part on a blind decoding limitation of the UE;
    determining respective numbers of available blind decodes for the one or more search space sets based at least in part on the total number of available blind decodes; and
    pruning the one or more sets of decoding candidates based at least in part on the respective numbers of available blind decodes for the one or more search space sets.

3. The method of claim 2, wherein the determining the respective numbers of available blind decodes comprises allocating the total number of available blind decodes for the one or more search space sets to the one or more search space sets in proportion to respective numbers of decoding candidates in the one or more search space sets.

4. The method of claim 2, wherein the determining the respective numbers of available blind decodes comprises uniformly allocating the total number of available blind decodes to the one or more search space sets.

5. The method of claim 2, wherein the determining the respective numbers of available blind decodes comprises allocating a minimum number of blind decodes to each of the one or more search space sets.

6. The method of claim 2, wherein the one or more sets of decoding candidates comprise one or more sets of UE-specific decoding candidates of one or more UE-specific search space sets, the method further comprising:
    identifying, for the control region, a set of common decoding candidates associated with a common search space set; and
    hashing the set of common decoding candidates to a second subset of CCEs of the control region, wherein the total number of available blind decodes is determined based at least in part on a number of decoding candidates of the set of common decoding candidates and the blind decoding limitation of the UE.

7. The method of claim 1, wherein the determining respective numbers of available CCEs for the one or more sets of decoding candidates comprises:
    allocating the total number of available CCEs to the one or more search space sets in proportion to respective numbers of CCEs spanned by respective sets of decoding candidates in the one or more search space sets.

8. The method of claim 1, wherein the determining the respective numbers of available CCEs for the one or more sets of decoding candidates comprises:
uniformly allocating the total number of available CCEs to the one or more search space sets, allocating a minimum number of CCEs to each of the one or more search space sets, or a combination therefore.

9. The method of claim 1, wherein the determining the respective numbers of available CCEs for the one or more sets of decoding candidates comprises:
allocating the total number of available CCEs to the one or more search space sets based at least in part on an aggregation level size of decoding candidates in the one or more search space sets.

10. The method of claim 1, wherein, for each of the one or more search space sets, the determining the applied one or more sets of decoding candidates comprises performing, for each aggregation level from a highest aggregation level to a lowest aggregation level of the each of the one or more search space sets:
identifying decoding candidates of the each aggregation level spanning a number of CCEs less than or equal to a remaining number of the number of available CCEs;
hashing the identified decoding candidates to CCEs of the first subset of CCEs; and
including decoding candidates of a next aggregation level lower than the each aggregation level that hash to CCEs of the first subset of CCEs.

11. The method of claim 1, wherein, for each of the one or more search space sets, the determining the applied one or more sets of decoding candidates comprises:
identifying, for each aggregation level from a highest aggregation level to a lowest aggregation level of the each of the one or more search space sets, decoding candidates of the each aggregation level spanning a number of CCEs less than or equal to a remaining number of the number of available CCEs;
hashing the identified decoding candidates to CCEs of the first subset of CCEs; and
including decoding candidates of aggregation levels lower than a lowest aggregation level that hashed to CCEs of the first subset of CCEs.

12. The method of claim 1, wherein the one or more sets of decoding candidates comprise one or more sets of UE-specific decoding candidates of one or more UE-specific search space sets, the method further comprising:
identifying, for the control region, a set of common decoding candidates associated with a common search space set; and
hashing the set of common decoding candidates to a second subset of CCEs of the control region, wherein the total number of available CCEs is determined based at least in part on the CCE channel estimation limitation and a number of CCEs of the second subset of CCEs.

13. The method of claim 12, wherein the determining the applied one or more sets of decoding candidates comprises:
admitting, prior to the admitting the second subset of the one or more sets of decoding candidates, a third subset of the one or more sets of decoding candidates having hashed locations overlapping with the second subset of CCEs.

14. An apparatus for wireless communication at a user equipment (UE), comprising:
a processor,
memory in electronic communication with the processor; and
instructions stored in the memory and executable by the processor to cause the apparatus to:
identify, for a control region of a control channel, one or more sets of decoding candidates associated with one or more search space sets;
determine a total number of available control channel elements (CCEs) for the one or more search space sets based at least in part on a CCE channel estimation limitation;
determine respective numbers of available CCEs for the one or more search space sets based at least in part on the total number of available CCEs;
determine an applied one or more sets of decoding candidates by hashing a first subset of the one or more sets of decoding candidates to a first subset of CCEs of the control region based at least in part on the respective numbers of available CCEs, and admitting a second subset of the one or more sets of decoding candidates having hashed locations overlapping with the first subset of CCEs; and
monitor the control region for the applied one or more sets of decoding candidates.

15. The apparatus of claim 14, wherein the instructions are further executable by the processor to cause the apparatus to:
determine a total number of available blind decodes for the one or more search space sets based at least in part on a blind decoding limitation of the UE;
determine respective numbers of available blind decodes for the one or more search space sets based at least in part on the total number of available blind decodes; and
prune the one or more sets of decoding candidates based at least in part on the respective numbers of available blind decodes for the one or more search space sets.

* * * * *